(12) United States Patent
Chaki et al.

(10) Patent No.: US 7,614,233 B2
(45) Date of Patent: Nov. 10, 2009

(54) OPERATION METHOD OF NUCLEAR POWER PLANT

(75) Inventors: Masao Chaki, Hitachi (JP); Kazuaki Kitou, Tokai (JP); Motoo Aoyama, Mito (JP); Masaya Ootsuka, Mito (JP); Kouji Shiina, Mito (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 698 days.

(21) Appl. No.: 11/340,643

(22) Filed: Jan. 27, 2006

(65) Prior Publication Data

US 2007/0000250 A1    Jan. 4, 2007

(30) Foreign Application Priority Data

Jan. 28, 2005    (JP)    ............................. 2005-021835
Mar. 10, 2005    (JP)    ............................. 2005-066498

(51) Int. Cl.
    *G21D 5/00* (2006.01)
(52) U.S. Cl. ........................................ 60/644.1; 60/653
(58) Field of Classification Search ............... 60/644.1, 60/646, 653, 657, 660
    See application file for complete search history.

(56) References Cited

U.S. PATENT DOCUMENTS

| | | | | |
|---|---|---|---|---|
| 3,999,787 A | * | 12/1976 | Park | 290/40 R |
| 4,387,577 A | * | 6/1983 | Campbell | 60/680 |
| 4,471,618 A | * | 9/1984 | Tratz et al. | 60/646 |
| 4,589,256 A | * | 5/1986 | Akiba et al. | 60/660 |
| 6,742,336 B2 | * | 6/2004 | Itou et al. | 60/646 |
| 7,032,384 B2 | * | 4/2006 | Kumagai et al. | 60/670 |

FOREIGN PATENT DOCUMENTS

| | | |
|---|---|---|
| JP | 8-233989 | 9/1996 |
| JP | 9-264983 | 10/1997 |

* cited by examiner

*Primary Examiner*—Hoang M Nguyen
(74) *Attorney, Agent, or Firm*—Brundidge & Stanger, P.C.

(57) ABSTRACT

In a nuclear power plant, thermal power in a second operation cycle of a nuclear reactor is uprated from thermal power in a first operation cycle preceding the second operation cycle by at least one operation cycle. A proportion of steam extracted from a steam system and introduced to a feedwater heater, which is in particular extracted from an intermediate point and an outlet of a high pressure turbine, with respect to a flow rate of main steam, is reduced in the second operation cycle from that in the first operation cycle such that the temperature of feedwater discharged from the feedwater heater is lowered by 1° C. to 40° C. in the second operation cycle.

12 Claims, 16 Drawing Sheets

Q: THERMAL POWER (%)
G: MASS FLOW RATE (%)
H: ENTHALPY (kJ/kg)

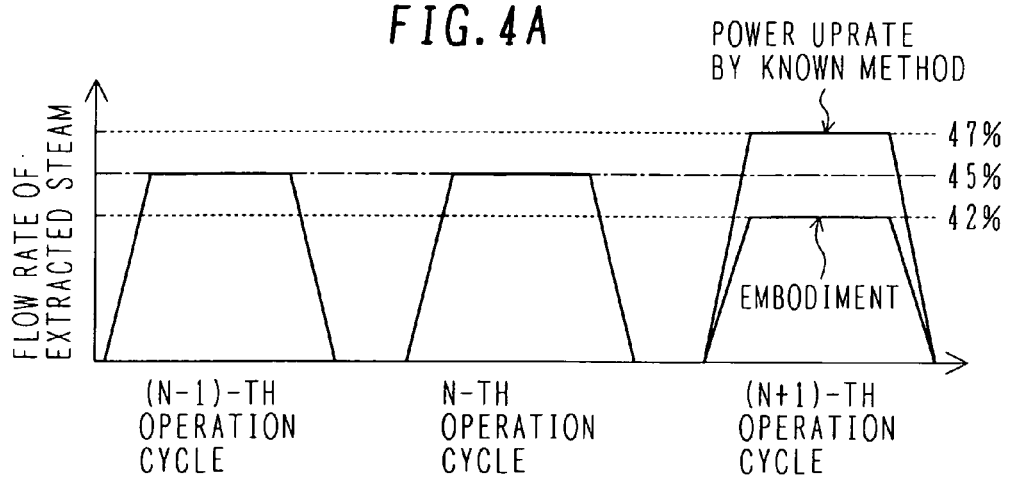
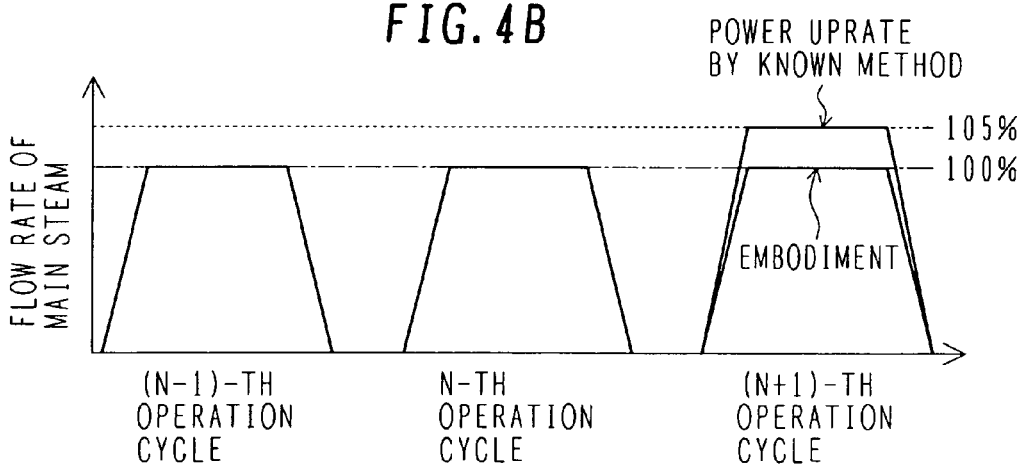
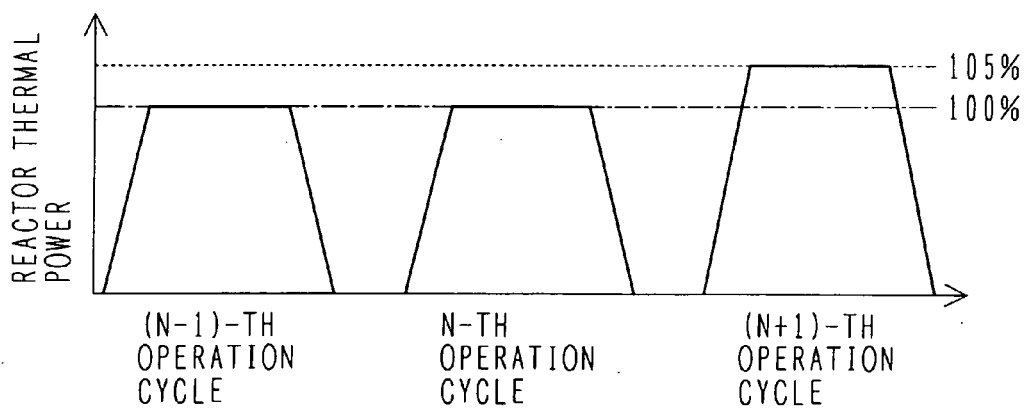

OPERATION METHOD OF NUCLEAR POWER PLANT

BACKGROUND OF THE INVENTION

1. Field of the Invention

The present invention relates to an operation method of a nuclear power plant and to a nuclear power plant. More particularly, the present invention relates to an operation method of a nuclear power plant and to a nuclear power plant, which are suitable for an uprate of normal operation power output of a nuclear power plant.

2. Description of the Related Art

In a newly constructed nuclear power plant, electric power has hitherto been uprated, for example, by improving the fuel makeup or the shape and makeup of a fuel assembly so as to increase the flow rate of main steam at a core outlet.

Such related art is disclosed in Patent Document 1 (JP,A 9-264983).

SUMMARY OF THE INVENTION

When the above-mentioned related art is applied to the existing nuclear power plant, the rate of core flow passing through a reactor core is substantially the same as that before the power uprate, while thermal power of the core is increased. In a boiling water reactor (BWR), therefore, an average void rate (proportion of steam with respect to the channel volume) in the core is increased. Accordingly, the flow speed of a coolant is increased and so is a pressure loss in the core. Also, with an increase in the amount of steam generated in the core, a pressure loss in a water-steam two-phase flow section is increased and a margin of core safety tends to reduce. Further, an increase of the average void rate in the core increases an amount of steam condensed in the so-called pressure transient state where pressure rises, for example, when a generator load is cut off, thus resulting in a larger amount of decrease of the average void rate in the core. Generally, the boiling water reactor has a negative void feedback coefficient so that the reactor power reduces as the void rate increases. In the pressure transient state, however, the average void rate in the core is reduced and the reactor power is increased. Thus, the related art has a possibility that, after the power uprate, the amount of decrease of the average void rate in the core is increased in the pressure transient state and a design margin for pressure transient events is reduced.

Meanwhile, the flow rate of main steam is increased substantially in proportion to an increase of the power uprate. The increased flow rate of main steam reduces design margins of almost all equipment, such as feedwater equipment including feedwater piping, a feedwater heater, a feedwater pump, etc., pressure vessel internals including a dryer, etc., a main steam line, a high pressure turbine, a low pressure turbine, and a condenser. In a usual nuclear power plant employing a boiling water reactor, the high pressure turbine is one of the equipment with a possibility that the design margin is first lost with the increase in the flow rate of main steam. Also, in a nuclear power system other than the boiling water reactor, a similar problem arises in a plant where the design margin for the high pressure turbine is relatively small. Accordingly, when the related art is applied to the existing nuclear power plant, large-scaled improvement and replacement of plant equipment are required. The increase in the flow rate of main steam can be suppressed by lowering the feedwater temperature. However, such a solution is not realistic for the reason that, if the flow rate of steam extracted for heating the feedwater is simply reduced as a whole, thermal efficiency is noticeably deteriorated and the electric power is not increased in proportion to the core thermal power output.

An object of the present invention is to provide an operation method of a nuclear power plant, which can uprate plant power without greatly modifying the construction of plant equipment, while keeping a core's pressure loss characteristic, a safety margin, and a design margin in the transient state substantially the same as those before the power uprate.

To achieve the above object, according to one aspect of the present invention, assuming that one operation cycle is defined as a period from a time at which a nuclear power plant starts operation to a time at which the nuclear power plant stops the operation for fuel exchange, second reactor thermal power in a second operation cycle of a nuclear reactor is uprated from first reactor thermal power in a first operation cycle preceding the second operation cycle at least one operation cycle, and a proportion of steam extracted from a steam system and introduced to a feedwater heater, which is in particular extracted from an intermediate point of a high pressure turbine and an outlet thereof (practically, some point in a section ranging from the outlet of the high pressure turbine to an inlet of one of a moisture separator, a moisture separator and heater, and a moisture separator and reheater), with respect to a flow rate of main steam is reduced in the second operation cycle from a proportion in the first operation cycle such that temperature of feedwater discharged from the feedwater heater lowers in the range of 1° C. to 40° C. in the second operation cycle.

To achieve the above object, according to another aspect of the present invention, second reactor thermal power in a second operation cycle of a nuclear reactor is uprated from first reactor thermal power in a first operation cycle preceding the second operation cycle at least one operation cycle, and a mass flow rate of steam extracted from a steam system and introduced to a feedwater heater, which is in particular extracted from an intermediate point and an outlet of a high pressure turbine, is reduced in the second operation cycle from a mass flow rate of steam extracted in the first operation cycle such that temperature of feedwater discharged from the feedwater heater lowers in the range of 1° C. to 40° C. in the second operation cycle.

To achieve the above object, according to still another aspect of the present invention, second reactor thermal power in a second operation cycle of a nuclear reactor is uprated from first reactor thermal power in a first operation cycle preceding the second operation cycle at least one operation cycle, and a temperature rise in one of a plurality of feedwater heaters, particularly a high pressure feedwater heater installed downstream of a main feedwater pump, is reduced in the second operation cycle such that temperature of feedwater discharged from the feedwater heater lowers in the range of 1° C. to 40° C. in the second operation cycle.

To achieve the above object, according to still another aspect of the present invention, second reactor thermal power in a second operation cycle of a nuclear reactor is uprated from first reactor thermal power in a first operation cycle preceding the second operation cycle at least one operation cycle, and at least one of extraction lines for extracting steam from a steam system and introducing the extracted steam to a feedwater heater, which is in particular extended from an intermediate point and an outlet of a high pressure turbine, is shut off such that temperature of feedwater discharged from the feedwater heater lowers in the range of 1° C. to 40° C. in the second operation cycle.

To achieve the above object, according to another aspect of the present invention, second reactor thermal power (Q2) in a second operation cycle of a nuclear reactor is uprated A % from first reactor thermal power (Q1) in a first operation cycle preceding the second operation cycle at least one operation cycle, and a proportion of steam extracted from a steam system and introduced to a feedwater heater, which is in particular extracted from an intermediate point of a high pressure turbine and an outlet thereof (practically, some point in a section ranging from the outlet of the high pressure turbine to an inlet of one of a moisture separator, a moisture separator and heater, and a moisture separator and reheater), with respect to a flow rate of main steam in the second operation cycle is kept equivalent to or reduced from a proportion in the first operation cycle such that the following formulae are satisfied;

$$0 < A \leq 5, \text{ and}$$

$$T2 \leq T1 - 7.7 \times (Q2 - Q1)/(4.5 \times W)$$

where temperature of the feedwater discharged from the feedwater heater in the first operation cycle is T1 (° C.), temperature of the feedwater discharged from the feedwater heater in the second operation cycle is T2 (° C.), and a core flow rate of the feedwater flowing into the nuclear reactor in the second operation cycle is W (kg/s).

To achieve the above object, according to another aspect of the present invention, second reactor thermal power (Q2) in a second operation cycle of a nuclear reactor is uprated A % from first reactor thermal power (Q1) in a first operation cycle preceding the second operation cycle at least one operation cycle, and a proportion of steam extracted from a steam system and introduced to a feedwater heater, which is in particular extracted from an intermediate point of a high pressure turbine and an outlet thereof (practically, some point in a section ranging from the outlet of the high pressure turbine to an inlet of one of a moisture separator, a moisture separator and heater, and a moisture separator and reheater), with respect to a flow rate of main steam in the second operation cycle is kept equivalent to or reduced from a proportion in the first operation cycle such that the following formulae are satisfied;

$$5 < A \leq 10, \text{ and}$$

$$T1 - 40 \leq T2 \leq T1 - 7.7 \times (Q2 \times (A+95)/100 - Q1)/(4.5 \times W)$$

where temperature of the feedwater discharged from the feedwater heater in the first operation cycle is T1 (° C.), temperature of the feedwater discharged from the feedwater heater in the second operation cycle is T2 (° C.), and a core flow rate of the feedwater flowing into the nuclear reactor in the second operation cycle is W (kg/s).

To achieve the above object, according to another aspect of the present invention, second reactor thermal power (Q2) in a second operation cycle of a nuclear reactor is uprated A % from first reactor thermal power (Q1) in a first operation cycle preceding the second operation cycle at least one operation cycle, and a proportion of steam extracted from a steam system and introduced to a feedwater heater, which is in particular extracted from an intermediate point of a high pressure turbine and an outlet thereof (practically, some point in a section ranging from the outlet of the high pressure turbine to an inlet of one of a moisture separator, a moisture separator and heater, and a moisture separator and reheater), with respect to a flow rate of main steam in the second operation cycle is kept equivalent to or reduced from a proportion in the first operation cycle such that the following formulae are satisfied;

$$10 < A < 30, \text{ and}$$

$$T2 \leq T1 - 7.7 \times (Q2 \times (A+90)/100 - Q1)/(4.5 \times W)$$

where temperature of the feedwater discharged from the feedwater heater in the first operation cycle is T1 (° C.), temperature of the feedwater discharged from the feedwater heater in the second operation cycle is T2 (° C.), and a core flow rate of the feedwater flowing into the nuclear reactor in the second operation cycle is W (kg/s).

To achieve the above object, according to still another aspect of the present invention, a nuclear power plant comprises an extracted flow control valve disposed in at least one extraction line; a temperature sensor disposed in a feedwater system at a point between adjacent two of a plurality of feedwater heaters disposed in the feedwater system or at a point downstream of one of the plurality of feedwater heaters which is positioned most downstream; and an extracted flow controller for outputting an opening request command for the extracted flow control valve based on a measured value from the temperature sensor and a set value of feedwater temperature, wherein the nuclear power plant is operated such that second nuclear thermal power in a second operation cycle of the nuclear reactor is uprated from first nuclear thermal power in a first operation cycle before the second operation cycle, and second feedwater temperature in the second operation cycle is made lower than first feedwater temperature in the first operation cycle.

Since the feedwater temperature can be adjusted to a set value through control of the opening of the extracted flow control valve, it is possible to suppress variations in the amount of power generated during the power uprate operation of the nuclear power plant.

To achieve the above object, according to still another aspect of the present invention, a nuclear power plant comprises an extracted flow control valve and an extraction flow rate measuring meter disposed in at least one extraction line; and an extracted flow controller for outputting an opening request command for the extracted flow control valve based on a measured value from the extraction flow rate measuring meter and a set value of a flow rate of the extracted steam, wherein the nuclear power plant is operated such that second nuclear thermal power in a second operation cycle of the nuclear reactor is uprated from first nuclear thermal power in a first operation cycle before the second operation cycle, and second feedwater temperature in the second operation cycle is made lower than first feedwater temperature in the first operation cycle.

To achieve the above object, according to still another aspect of the present invention, a nuclear power plant comprises an extracted flow control valve disposed in at least one extraction line; at least one main steam flow rate measuring meter disposed in a steam system between the nuclear reactor and the high pressure turbine; and an extracted flow controller for outputting an opening request command for the extracted flow control valve based on a measured value from the main steam flow rate measuring meter and a set value of a flow rate of the main steam, wherein the nuclear power plant is operated such that second nuclear thermal power in a second operation cycle of the nuclear reactor is uprated from first nuclear thermal power in a first operation cycle before the second operation cycle, and second feedwater temperature in the second operation cycle is made lower than first feedwater temperature in the first operation cycle.

According to the present invention, in trying to uprate power of the existing nuclear power plant, the power uprate of the nuclear power plant can be realized without greatly modifying the construction of the nuclear power plant, while keeping a core's pressure loss characteristic, a safety margin, a thermal margin, and a design margin in the transient state substantially the same as those before the power uprate.

BRIEF DESCRIPTION OF THE DRAWINGS

FIG. 4 graphically shows the relationships of operation cycle versus reactor thermal power, flow rate of main steam and flow rate of extracted steam;

DESCRIPTION OF THE PREFERRED EMBODIMENTS

First Embodiment

A first embodiment represents the case where the present invention is applied to a boiling water reactor system as one of nuclear power plants.

The overall construction of the boiling water reactor system according to this embodiment will be first described with reference to FIG. 1.

Figure 1:
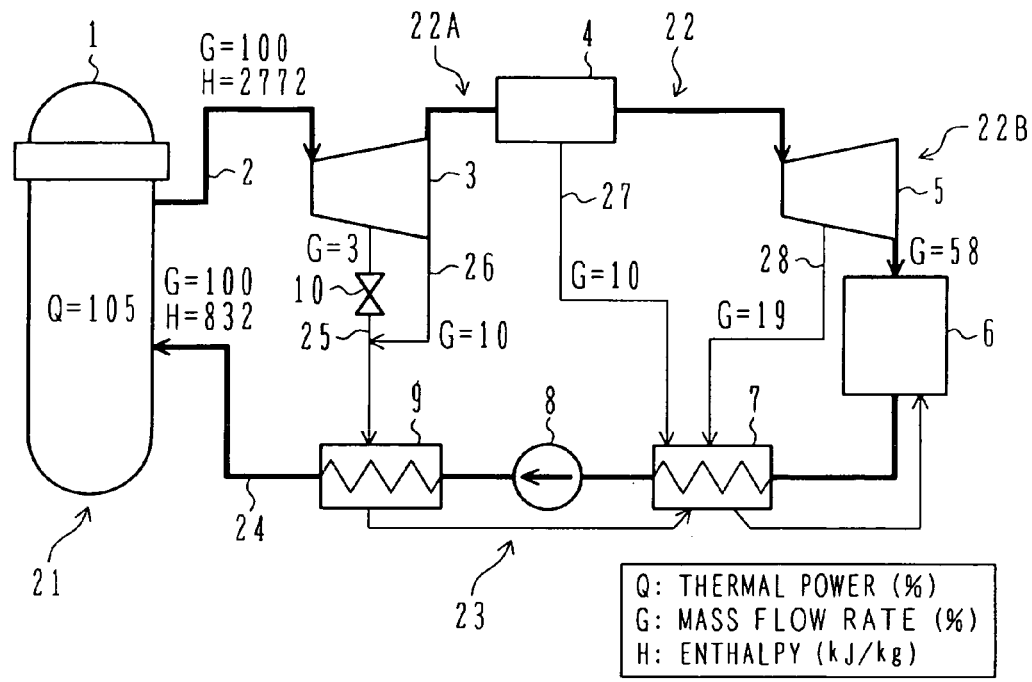
FIG. 1 is an overall schematic view showing the overall construction of a boiling water reactor system according to a first embodiment of the present invention along with heat balance obtained by an operation method according to the first embodiment of the present invention.

In FIG. 1, reference numeral 1 denotes a reactor pressure vessel. Recirculation pumps and jet pumps are installed outside and inside the reactor pressure vessel 1 to regulate the rate of flow passing through a core (i.e., a core flow rate). The reactor pressure vessel 1 and its internals constitute a reactor 21, and steam generated in the reactor 21 is supplied to a steam system 22. The steam system 22 comprises a main steam line 2, a high pressure turbine 3 and a low pressure turbine 5 connected to the main steam line 2 in series, and a moisture separator 4 disposed between the high pressure turbine 3 and the low pressure turbine 5. A section including the high pressure turbine 3, which extends from a reactor outlet to an inlet of the low pressure turbine 5, constitutes a high pressure steam system 22A, and a section extending from the inlet of the low pressure turbine 5 to an inlet of a condenser 6 constitutes a low pressure steam system 22B. The condenser 6 condenses steam discharged from the low pressure turbine 5. The condensate condensed by the condenser 6 is supplied as feedwater to a feedwater system 23. The feedwater system 23 heats the feedwater and returns it to the reactor 21. The feedwater system 23 includes a main feedwater pump 8, a low pressure feedwater heater 7 installed downstream of the condenser 6 and upstream of the main feedwater pump 8 and heating the feedwater supplied from the condenser 6, and a high pressure feedwater heater 9 installed downstream of the main feedwater pump 8 and upstream of the reactor 21. The feedwater discharged from the high pressure feedwater heater 9 is introduced to the reactor 21 via a feedwater line 24.

Extraction lines 25, 26, 27 and 28 for extracting steam from the steam system 22 and introducing the extracted steam to the high pressure feedwater heater 9 and the low pressure feedwater heater 7 are disposed between the steam system 22 and corresponding one of the high pressure feedwater heater 9 and the low pressure feedwater heater 7. The extraction line 25 extracts steam from an intermediate point of the high pressure turbine 3 and introduces the steam to the high pressure feedwater heater 9. The extraction line 26 extracts steam from an outlet of the high pressure turbine 3 (actually some point downstream of the outlet of the high pressure turbine 3 and upstream of an inlet of the moisture separator 4) and introduces the steam to the high pressure feedwater heater 9. The extraction line 27 extracts steam from an intermediate point of the moisture separator 4 and introduces the steam to the low pressure feedwater heater 7. The extraction line 28 extracts steam from an intermediate point of the low pressure turbine 5 and introduces the steam to the low pressure feedwater heater 7. An extraction line flow adjusting valve 10, i.e., extracted steam amount adjusting means for adjusting an extracted steam amount introduced from the intermediate point of the high pressure turbine 3 to the high pressure feedwater heater 9, is disposed in the extraction line 25.

Figure 2:
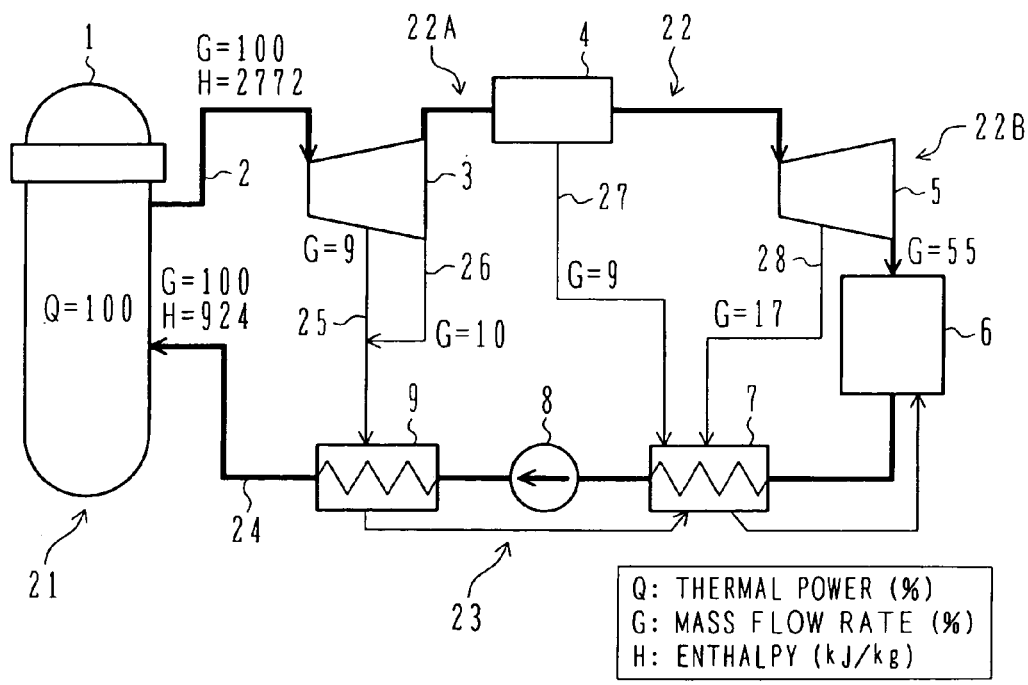
FIG. 2 is an overall schematic view showing heat balance in the boiling water reactor system before power uprate.
Figure 3:
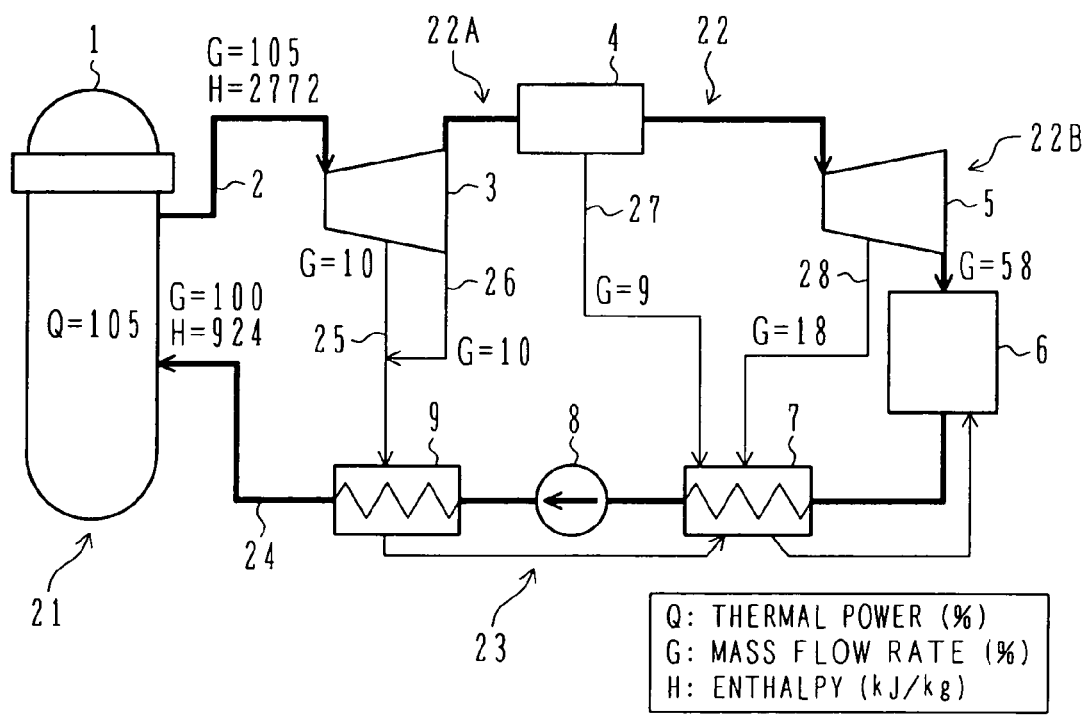
FIG. 3 is an overall schematic view showing heat balance in the boiling water reactor system when the known power uprate method is applied.

The operation method of the thus-constructed nuclear power plant according to this embodiment will be described below. In FIGS. 1, 2 and 3, to explain heat balances, the reactor thermal power is represented by Q, the mass flow rate of water and steam is represented by G, and the enthalpy of water and steam is represented by H. The thermal power Q and the mass flow rate G are expressed by ratios (%) relative to the reactor thermal power and the steam flow rate at an outlet of a reactor pressure vessel, respectively, when the reactor is in the state before power uprate as shown in FIG. 2. The enthalpy is expressed by a numerical value in units of (kJ/kg). Note that each embodiment of the present invention represents the ordinary operation state and excludes the startup and shutdown states, the transient state, the operation state where the core thermal power is changed by moving a control rod position in a core to change the control rod pattern etc., and the operation state in the event of an accident.

In the heat balances shown in FIGS. 1-3, as mentioned above, the thermal power Q and the mass flow rate G are expressed by ratios (%) relative to the reactor thermal power and the steam flow rate at the outlet of the reactor pressure vessel, respectively, when the reactor is in the state before power uprate as shown in FIG. 2. According to the operation method of this embodiment, as seen from the heat balances shown in FIGS. 1-3, when second reactor thermal power in a second operation cycle (FIG. 1) of the reactor 21 is uprated from first reactor thermal power (FIG. 2) in a first operation cycle (FIG. 2) prior to the second operation cycle (i.e., Q=100→105), a proportion (13/100) of the mass flow rate (G=3+10=13) of steam extracted from the high pressure steam system 22A in the second operation cycle with respect to the mass flow rate (G=100) of main steam at the reactor outlet is reduced from a proportion (19/100) of the mass flow rate (G=9+10=19) of steam extracted from the high pressure steam system 22A and introduced to the feedwater heater 9 in the first operation cycle with respect to the mass flow rate (G=100) of main steam at the reactor outlet (i.e., 19/100→13/100). Also, the temperature of the feedwater discharged from the feedwater heater 9 is lowered in the second operation cycle (H=832) from that in the first operation cycle (H=924). As described later, an extent to which the feedwater temperature is lowered in the second operation cycle from that in the first operation cycle is in the range of 1° C. to 40° C. Incidentally, one operation cycle is a period from a time at which the reactor operation is started up from the shutdown state to a time at which the reactor operation is shut down for fuel exchange. Further, the feedwater temperature is one measured at the period of the rated operation (maximum power output operation), but not the period of the partial power output operation such as the process of starting up and shutting down, as stated later.

Looking from another aspect, according to the operation method of this embodiment, the mass flow rate (G=3+10=13) of steam extracted from the high pressure steam system 22A is reduced (G=19→13) in the second operation cycle (FIG. 1) from the mass flow rate (G=9+10=19) of steam extracted from the high pressure steam system 22A and introduced to the feedwater heater 9 in the first operation cycle (FIG. 2), and the temperature of the feedwater discharged from the feedwater heater 9 is lowered in the second operation cycle from that in the first operation cycle. Alternatively, it can also be said that, by making a temperature rise in the feedwater heater 9 during the second operation cycle (FIG. 1) smaller than a temperature rise in the feedwater heater 9 during the first operation cycle (FIG. 2), the temperature of the feedwater discharged from the feedwater heater 9 is lowered in the second operation cycle (H=832) from that in the first operation cycle (H=924).

The operation method of this embodiment will be described in more detail below.

FIG. 4 graphically shows the relationships of operation cycle versus reactor thermal power, flow rate of main steam (amount of steam flowing from the reactor pressure vessel 1 to the main steam line 2), and flow rate of extracted steam in this embodiment as compared with the power uprate by the known method. Note that one operation cycle is defined as a period from a time at which the reactor operation is started up from the shutdown state to a time at which the reactor operation is shut down for fuel exchange. Further, the feedwater temperature is one measured at the period of the rated operation (maximum power output operation), but not the period of the partial power output operation such as the process of starting up and shutting down, as stated later.

Figure 5A:
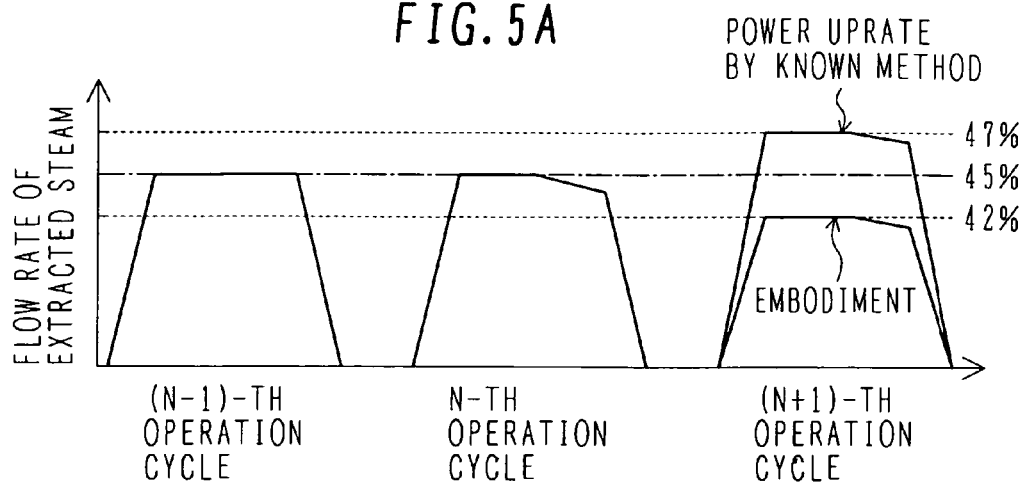
FIG. 5 graphically shows the relationships of operation cycle versus reactor thermal power, flow rate of main steam and flow rate of extracted steam.
Figure 5B:
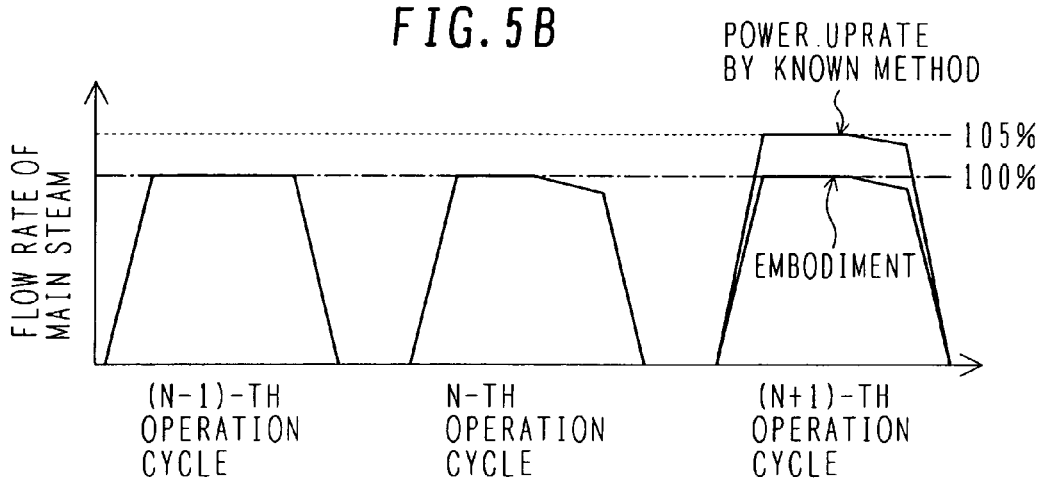
Figure 5C:
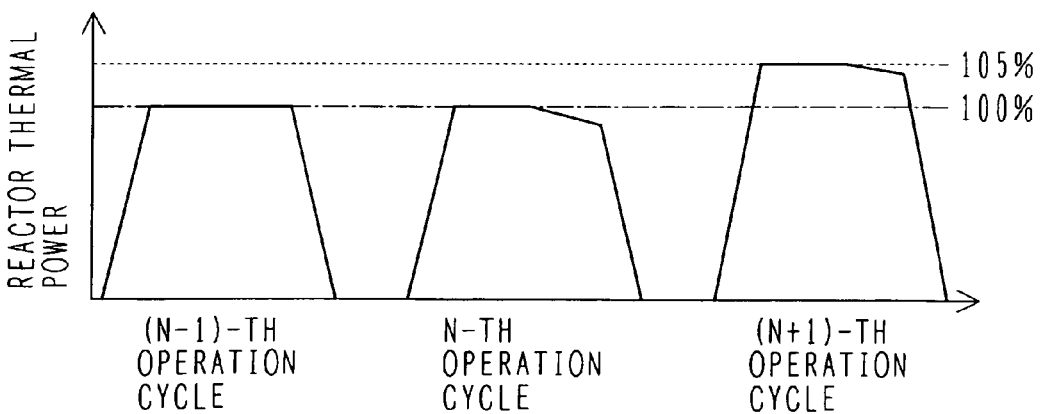
Figure 6:
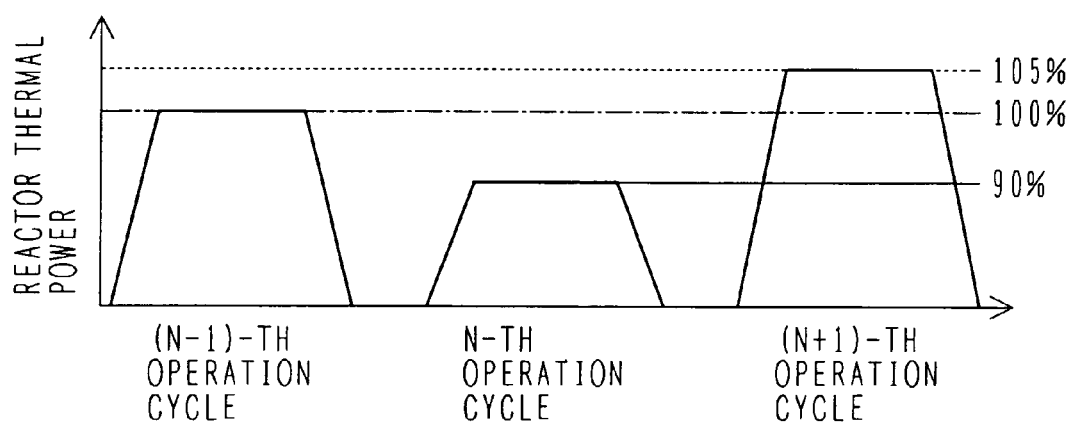
FIG. 6 graphically shows the relationships of operation cycle versus reactor thermal power, flow rate of main steam and flow rate of extracted steam.

Of operation cycles shown in FIG. 4, the N-th operation cycle represents a cycle before the power uprating method of the present invention is applied. At that time, the reactor thermal power is Q=100%. FIG. 2 shows one example of heat balance prior to the power uprate. The (N+1)-th operation cycle represents a cycle in which the reactor thermal power is uprated 5% to obtain Q=105%. Means for uprating the reactor thermal power can be realized by increasing the amount of withdrawal of a control rod in the (N+1)-th operation cycle from that in the N-th operation cycle, or by raising the rotation speed of the recirculation pump to increase the core flow rate in the (N+1)-th operation cycle from that in the N-th operation cycle, or by modifying the kind of a fuel assembly. Also, because the temperature of the feedwater supplied to the reactor pressure vessel 1 is lowered with application of the present invention, it is expected that the reactor thermal power is naturally uprated with coolant density feedback as a result of lowering of the coolant temperature at a core inlet. In some plant, the flow rate of the extracted steam and the flow rate of the main steam are changed during one operation cycle as shown in FIG. 5. FIG. 5 shows an example in which, in the (N+1)-th operation cycle, the reactor thermal power is reduced midway one operation cycle with a drop of core reactivity, whereupon the flow rate of the extracted steam and the flow rate of the main steam are reduced (coasted down). Other than the operation cycle shown in FIG. 5, the reactor power is also temporarily reduced, for example, when the amount of insertion of the control rod in the core is changed. For those reasons, in this embodiment, the heat balance, the flow rate of the extracted steam, the flow rate of the main steam, the core flow rate, the feedwater temperature, the reactor thermal power, the extent of heating of the feedwater, etc. are compared at an operation point where the flow rate of the main steam is maximized during the operation cycle, except for the startup and shutdown states, the operation state where the core thermal power is changed by operating the control rod, in the event of an accident or a transient phenomenon, and the test operation. In other words, such an operation point means a point where the reactor thermal power is maximized during the operation cycle. Further, when the thermal power is 100% in the (N−1)-th operation cycle, but the thermal power is largely reduced from the rated power of 100% for some reason in the N-th cycle as shown in FIG. 6, the (N−1)-th operation cycle represents the cycle before the present invention is applied (i.e., the first operation cycle), and the (N+1)-th operation cycle represents the cycle in which the present invention is applied (i.e., the second operation cycle).

When the reactor thermal power is uprated, the flow rate of the feedwater has to be increased or the enthalpy difference of a coolant between the inlet and the outlet of the reactor pressure vessel has to be increased in order to remove heat that has increased in amount corresponding to the power uprate. The known power uprating method employs the former manner; namely it increases the flow rate of the feedwater in proportion to the reactor thermal power. An example of heat balance according to the known power uprating method is shown in FIG. 3. As a result of the known power uprating method, the flow rate of the main steam in the (N+1)-th operation cycle is increased to 105% as shown in FIG. 4. The present invention employs the latter manner; namely it intentionally reduces the coolant enthalpy at the inlet of the reactor pressure vessel, to thereby increase the enthalpy difference between the inlet and the outlet of the reactor pressure vessel. The coolant enthalpy at the inlet of the reactor pressure vessel can be reduced by reducing the flow rate of extracted steam from the steam system 22 and supplied to the feedwater heater 9. However, if the flow rate of the extracted steam is simply reduced as a whole, the thermal efficiency is largely reduced and the amount of generated power cannot be so increased. Such a reduction of the thermal efficiency can be suppressed by selectively reducing the extraction of steam from the high pressure steam system 22A, which is constituted by the section including the high pressure turbine 3 and extending from the reactor outlet to the inlet of the low pressure turbine 5. The reason is that the steam in the high pressure steam system 22A has higher energy than the steam in the low pressure steam system 22B, which is constituted by the section extending from the inlet of the low pressure turbine 5 to the inlet of the condenser 6, and a thermal loss is reduced by selectively reducing the extraction of steam from the high pressure steam system 22A, whereby the reduction of the thermal efficiency resulting from the power uprate can be suppressed. To selectively reduce the extraction of steam from a relatively high energy portion in the high pressure steam system 22A and to suppress the reduction of the thermal efficiency, in this embodiment, the flow rate of steam extracted from an intermediate point of the high pressure turbine 3 or the outlet of the high pressure turbine 3 (actually some point between the outlet of the high pressure turbine 3 and the inlet of the moisture separator 4) is selectively reduced so that the flow rate of steam flowing into the low pressure turbine 5 is increased and the amount of generated power is increased. A large part of the steam extracted from the intermediate point of the high pressure turbine 3 or the outlet of the high pressure turbine 3 is used in the high pressure feedwater heater 9 installed downstream of the main feedwater pump 8. Looking from another aspect, therefore, the power uprating method according to the present invention can also be said as a method of reducing the extent of adding the thermal energy to the feedwater in the region downstream of the main feed water pump 8.

In a plant where the flow rate of steam extracted from the intermediate point of the high pressure turbine 3 or the outlet of the high pressure turbine 3 is originally small, the flow rate of steam extracted from the low pressure turbine 5 has to be also reduced in order to sufficiently lower the feedwater temperature. Even when the present invention is applied to such a plant, a certain effect can be obtained by reducing the flow rate of steam extracted from the intermediate point of the high pressure turbine 3 or the outlet of the high pressure turbine 3 to a larger extent. With this embodiment, in spite of increasing the reactor thermal power by 5% as compared with the N-th operation cycle, the flow rate of the main steam can be kept the same as that in the N-th operation cycle. Because this embodiment is described in connection with the ideal power uprating method, the flow rate of the main steam is the same in both the N-th operation cycle and the (N+1)-th operation cycle. However, the flow rate of the main steam is not always required to be the same in those operation cycles, and the flow rate of the main steam may be increased within the range of a design margin of the equipment including the high pressure turbine 3.

When there are a plurality of extraction points usable to reduce the flow rate of the extracted steam, i.e., when there are a plurality of extraction points midway the high pressure turbine 3 or at the outlet of the high pressure turbine 3, a maximum effect can be obtained by selecting the most upstream extraction point. In such a case, while the extraction line flow adjusting valve 10 for controlling the flow rate of the extracted steam may be disposed to reduce the flow rate of the extracted steam, one or more of the extraction lines may be completely closed as an alternative manner. To close the extraction line, a shut-off valve is disposed midway the extraction line, or the extraction line is plugged. When the extraction line is completely closed, equipment for controlling the flow rate of the extracted steam is not required and the operation control is simplified. Whether to control the flow rate of the extracted steam or completely close the extraction line depends on the heat balance and the extent of power uprate in the plant. (In the case where the flow rate of the extracted steam per extraction line is too large, the feedwater temperature is excessively lowered if the extraction line is completely closed. Therefore, the flow rate of the extracted steam is adjusted in that case.)

According to this embodiment, even when the reactor thermal power is uprated to increase the amount of power generated in the nuclear power plant, increases of both the flow rate of the feedwater and the flow rate of the main steam can be suppressed, whereby an increase of burdens imposed on the feedwater line 24, the main steam line 2, and the pressure vessel internals can be suppressed. As compared with the case of simply reducing the flow rate of the extracted steam as a whole, it is possible to suppress decrease of the thermal efficiency and to obtain larger electric power. Further, although the high pressure turbine 3 must be usually replaced when power is uprated to a large extent by the known power uprating method, this embodiment can provide a wider power uprate range available without replacing the high pressure turbine 3 than that provided by the known method.

With the operation method of this embodiment, the feedwater temperature is lowered. The lowering of the feedwater temperature lowers the coolant temperature at the core inlet and increase the thermal margin of the core (corresponding to MCPR (Minimum Critical Power Ratio) in BWR), thus resulting in an advantage of ensuring higher safety than that obtained with the known power uprating method. The conventional power uprate increases the core pressure loss and reduces the safety margin if the same fuels are used. In contrast, the power uprating method of the present invention lowers the coolant temperature at the core inlet and reduces the void rate and the absolute value of the void coefficient in the core. Therefore, the core pressure loss is reduced and a reduction of the safety margin of the core is suppressed. Further, the design margin for the pressure rising transient state is increased with the reduction of the void rate and the absolute value of the void coefficient in the core.

Thus, the lowering of the feedwater temperature is effective in suppressing the deterioration of core characteristics and the reduction of the design margin in the boiling water reactor during the power update operation. Generally, because feedwater temperature control is not especially performed in the boiling water reactor, the feedwater temperature may change to the extent of smaller than 1° C. even in the same boiling water reactor and at the same core thermal power due to change of heat balance in the entire plant, in particular temperature change of the coolant (seawater in many cases) that is used to condense the steam by the condenser 6 shown in FIG. 1. In this embodiment, an extent to which the feedwater temperature is lowered is set to about 20° C. Regarding the extent to which the feedwater temperature should be lowered to compensate for the deterioration of the core characteristics in the power uprate operation, however, the effect of this embodiment can be obtained with a significant result by lowering the feedwater temperature by a value of not smaller than 1° C. that corresponds to the magnitude at which the feedwater temperature is changed in the ordinary operation. In addition, when the feedwater enters the reactor pressure vessel 1, it is mixed with water at the saturation temperature inside the reactor. Accordingly, there is a temperature difference between the feedwater line 24 and the pressure vessel 1. If the feedwater temperature is too lowered, the temperature difference in such a mixing area is increased, thus causing a risk that a design limit is exceeded from the viewpoint of thermal fatigue. From this point of view, a limit of the extent to which the feedwater temperature should be lowered from the current operation temperature is 40° C.

The reduction of the core pressure loss means that an increase of loads imposed on the jet pump and the recirculation pump, which are used for recirculation of the coolant, due to the power uprate can also be suppressed. Further, since the amount of increase in quantity of steam generated in the core is comparatively smaller than that of the thermal power, an influence upon the carry under caused by entrainment with the recirculation water can also be kept small and the flow window can be easily ensured even in the case of large power uprate.

Table 1, given below, shows the relationships among the reactor thermal power, the flow rate of the main steam, the flow rate of the extracted steam, and the enthalpy of the feedwater when the power uprating method of this embodiment is applied to the cases of uprating the power at various rates. Each value of the reactor thermal power and the flow rate of the main steam represents a ratio relative to that at 100% of the reactor thermal power, and a value of the flow rate of the extracted steam represents a ratio relative to the flow rate of the main steam at 100% of the reactor thermal power. As seen from Table 1, the power uprating method of this embodiment can be applied over a wide range including even the case where the reactor thermal power is uprated to 110%. The reason why Table 1 shows only the power uprate up to 110% is that the power uprate in excess of 110% requires replacement of the moisture separator 4. If the replacement of the moisture separator 4 is allowed or a combination with, e.g., an increase of the core pressure and/or with employment of a moisture separator and reheater is considered, the power uprating method of this embodiment can be applied over a wider range of power uprate.

In the boiling water reactor, uprate of the reactor thermal power up to about 102% is generally feasible just by increasing the measurement accuracy of a feedwater flowmeter, etc. Therefore, the present invention is more effective when applied to the case of uprating the reactor thermal power in excess of 102%. Further, at the power uprate up to about 105% of the reactor thermal power, substantial change of system equipment, e.g., replacement of the high pressure turbine 3, is not required in general. The effect of this embodiment is especially noticeable when applied to the uprate of the reactor thermal power in excess of 105% because the replacement of the high pressure turbine 3 is not required even in that case.

In view of the above-mentioned fact that substantial change of system equipment, e.g., replacement of the high pressure turbine 3, is not required in general at the ordinary power uprate up to about 105% of the reactor thermal power, an application method of this embodiment may be changed between the case of uprating the reactor thermal power at a rate of not larger than 5% and the case of uprating the reactor thermal power at a rate of larger than 5%. More specifically, because the replacement of the high pressure turbine 3 is not required when the increase rate of the reactor thermal power is not larger than 5%, it is primarily intended to keep the above-mentioned core characteristic (core average void rate) the same as that before the power uprate. Assuming that the reactor thermal power before the power uprate is Q1 (kW), the reactor thermal power after the power uprate is Q2 (kW), and the increase rate of the power uprate is A (%), the power uprate of not larger than 5% is expressed by $A \leq 5$. Also, on an assumption that the core flow rate after the power uprate is W (kg/s), the specific heat at constant pressure at about 200° C. under 7 MPa, i.e., the operating pressure in a typical boiling water reactor, is about 4.5 (kJ/kg·K), and a proportion of the flow rate of the feedwater with respect to the core flow rate in the typical boiling water reactor is about 13%, the condition for keeping the core average void rate the same as that before the power uprate is given as follows.

Change in thermal value of the feedwater per 1° C. of the feedwater temperature is expressed by:

$$W(kg/s) \times 13\ (\%)/100\ (\%) \times 4.5\ (kJ/kg \cdot K) = W \times 13/100 \times 4.5\ (kW/K)$$

Assuming here that the feedwater temperature before the power uprate is T1 and the feedwater temperature after the power uprate is T2, the feedwater temperature T2 required to reduce the thermal value of the feedwater, which is equivalent to the thermal value (Q2−Q1) (kW) corresponding to the power uprate, is determined by the following equation:

$$Q2-Q1 = W \times 13/100 \times 4.5 \times (T1-T2)$$

In order to hold the core characteristics equivalent to or better than those before the power uprate, the feedwater thermal value is just required to be reduced by an amount of not smaller than the thermal value increased with the power uprate. The condition to meet such a requirement is expressed by:

$$Q2-Q1 \leq W \times 13/100 \times 4.5 \times (T1-T2)$$

This formula is rewritten into:

$$T2 \leq T1 - 7.7 \times (Q2-Q1)/(4.5 \times W)$$

Stated another way, by setting the feedwater temperature so as to satisfy the above formula in the case of the power uprate of not larger than 5%, the core characteristics, such as the thermal margin, the pressure loss characteristic, the safety margin, and the design margin in the transient state of the core, can be basically held equivalent to or better than those before the power uprate. Further, since the flow rate of the main steam is kept equivalent to or reduced from that before the power uprate, the design margin of the main steam system, including the high pressure turbine and the dryer, can also be held equivalent to or better than those before the power uprate.

A description is made of the feedwater temperature when the nuclear thermal power is uprated at a rate of larger than 5%, but not larger than 10%. When the nuclear thermal power is uprated at a rate of larger than 5% by the known power uprating method, the flow rate of the main steam is also

TABLE 1

| Reactor thermal power (%) | Flow rate of main steam (%) | Flow rate of extracted steam (%) | Enthalpy of feedwater (kJ/kg) |
|---|---|---|---|
| 100 | 100 | 45 | 924 |
| 103 | 100 | 43 | 869 |
| 105 | 100 | 42 | 831 |
| 107 | 100 | 40 | 795 |
| 110 | 100 | 38 | 739 |
| 110 | 105 | 42 | 831 | increased in excess of 5%, thus generally resulting in that the design margin of equipment, e.g., the high pressure turbine, is exceeded. Therefore, such equipment has to be replaced. In that case, by lowering the feedwater temperature as in this embodiment, the increase in the flow rate of the main steam can be held not larger than 5%.

Assuming here that the increase in the flow rate of the main steam up to 5% is allowed, a reduction of the feedwater thermal value required when the power uprate is increased at A (%) corresponds to the power increase of (A−5)% and is expressed by:

$$Q2 \times (A-5+100)/100 - Q1 = Q2 \times (A+95/100) - Q1$$

On the assumption that the feedwater temperature before the power uprate is T1 and the feedwater temperature after the power uprate is T2, the above thermal value can be offset when T1 and T2 satisfy the following formula:

$$Q2 \times (A+95/100) - Q1 = W \times 13/100 \times 4.5 \times (T1-T2)$$

Thus, the increase in the flow rate of the main steam can be held not larger than 5% by satisfying:

$$Q2 \times (A+95/100) - Q1 \leq W \times 13/100 \times 4.5 \times (T1-T2)$$

With rewrite of this formula, T2 is expressed by:

$$T2 \leq T1 - 7.7 \times (Q2 \times (A+95)/100 - Q1)/(4.5 \times W)$$

In the case of the power uprate being larger than 5%, but not larger than 10%, therefore, if the feedwater temperature T2 satisfies the above formula, the power uprate can be realized within the range of the design margin of the high pressure turbine, etc. and the replacement of such equipment is not required. Further, the design margins of the high pressure turbine and the core can be held equivalent to or larger than those resulting at the power uprate of 5% by the known method.

At the power uprate in excess of 10%, it is generally required in the boiling water reactor to replace, e.g., the moisture separator in addition to the high pressure turbine, etc. This problem can be overcome by lowering the feedwater temperature in a similar manner to hold the increase in the flow rate of the main steam to be not larger than 10% so that the replacement of the moisture separator is not required. The condition of meeting such a requirement in this case is given as follows for the rate A (%) of the power uprate based on the same concept as that when the power uprate is larger than 5%, but not larger than 10%:

$$Q2 \times (A-10+100)/100 - Q1 \leq W \times 13/100 \times 4.5 \times (T1-T2)$$

With rewrite of this formula, T2 is expressed by:

$$T2 \leq T1 - 7.7 \times (Q2 \times (A+90)/100 - Q1)/(4.5 \times W)$$

This indicates an extent of lowering of the feedwater temperature within which the replacement of the moisture separator is not required at the power uprate of larger than 10%. In that case, the design margins of the high pressure turbine and the core can also be held equivalent to or larger than those resulting at the power uprate of 10% by the known method.

At any of the power uprate of not larger than 5%, the power uprate of larger than 5%, but not larger than 10%, and the power uprate of larger than 10%, the extent of lowering of the feedwater temperature in excess of 40° C. is undesired in practice from the viewpoint of thermal fatigue. Also, as the power uprate increases, the thermal margin of the core is reduced. It can be generally said that the thermal margin of the core is bearable for the power uprate up to about 20% by employing new fuel. Another conceivable solution is to improve, e.g., a pump for increasing the core flow rate. Even in consideration of such an improvement as well, the power uprate at a rate of about 30% is regarded to be a limit from the viewpoint of the core characteristics. Further, looking at the equipment side, the power uprate over 30% is also not desired in practice because such large power uprate exceeds the design limits of the low pressure turbine and the condenser, which are more expensive than the high pressure turbine, and hence requires replacement of those other units of equipment.

According to this embodiment, for the power uprate of not larger than 5%, the power uprate can be realized while holding the design margins of the high pressure turbine and the core equivalent to or larger than those before the power uprate. For the power uprate of larger than 5%, but not larger than 10%, the power uprate can be realized up to 10% while holding the design margins of the high pressure turbine and the core equivalent to or larger than those resulting at the power uprate of 5% by the known method. For the power uprate of larger than 10%, the power uprate can be realized in excess of 10% with no need of replacing the moisture separator, etc. while holding the design margins of the moisture separator and the core equivalent to or larger than those resulting at the power uprate of 10% by the known method.

Figure 7:
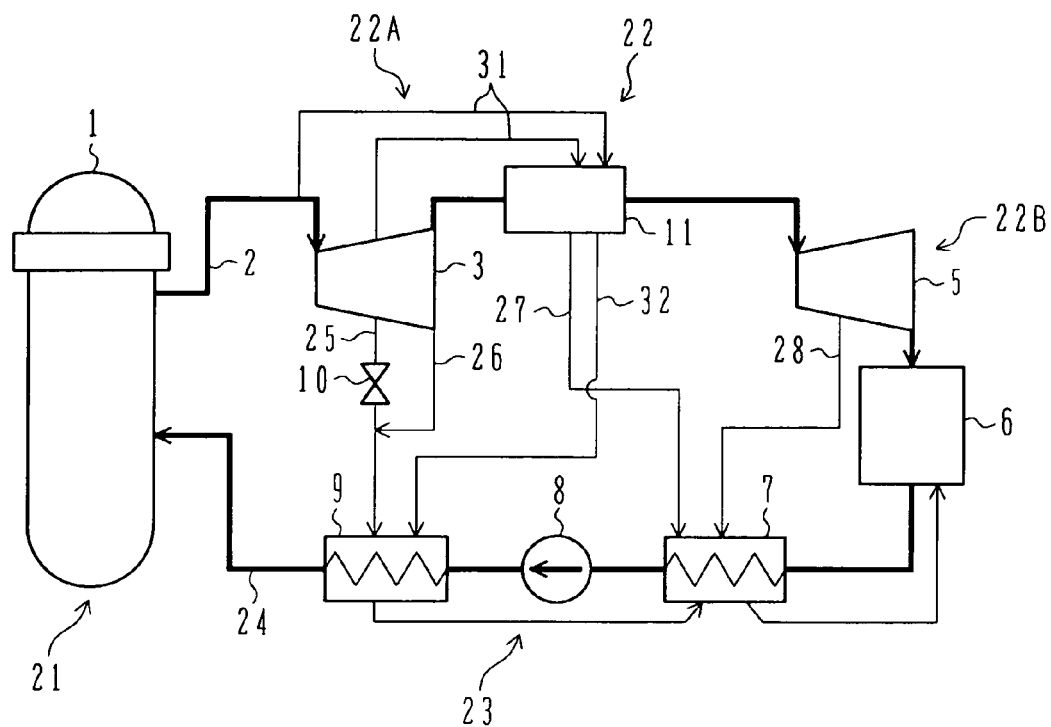
FIG. 7 is an overall schematic view showing the overall construction of a boiling water reactor system equipped with a moisture separator and heater or a moisture separator and reheater.

The present invention can be modified in various ways without being restricted to the above-described embodiment. For example, in the boiling water reactor system, a moisture separator and heater or a moisture separator and reheater 11, shown in FIG. 7, may be used instead of the moisture separator 4. Even in that case, although a steam extraction line 31 and a drain line 32 are added, the operation method of the present invention can be applied as in the above-described embodiment and can provide similar advantages without causing substantial change with regards to main parameters, such as the feedwater temperature and the flow rate of the main steam.

While the above embodiment is described as applying the present invention to the boiling water reactor power plant, the present invention is applicable to a pressurized water reactor system as well.

Second Embodiment

Figure 8:
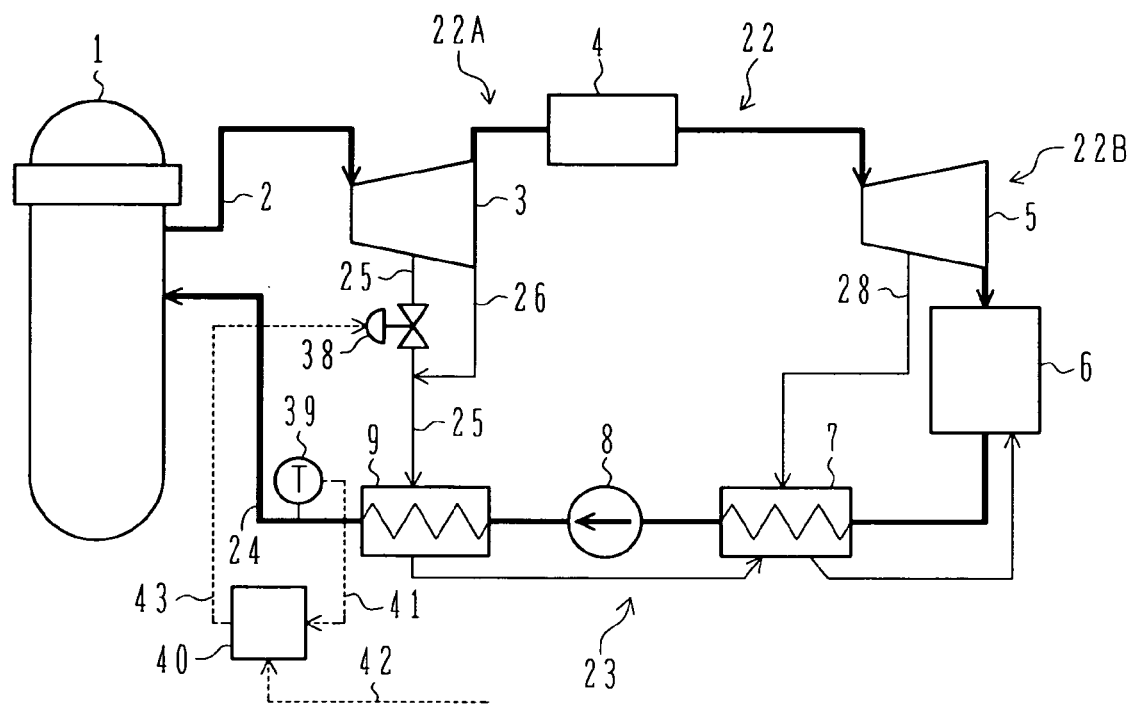
FIG. 8 is a schematic view of a boiling water reactor power plant according to a second embodiment of the present invention.
Figure 9:
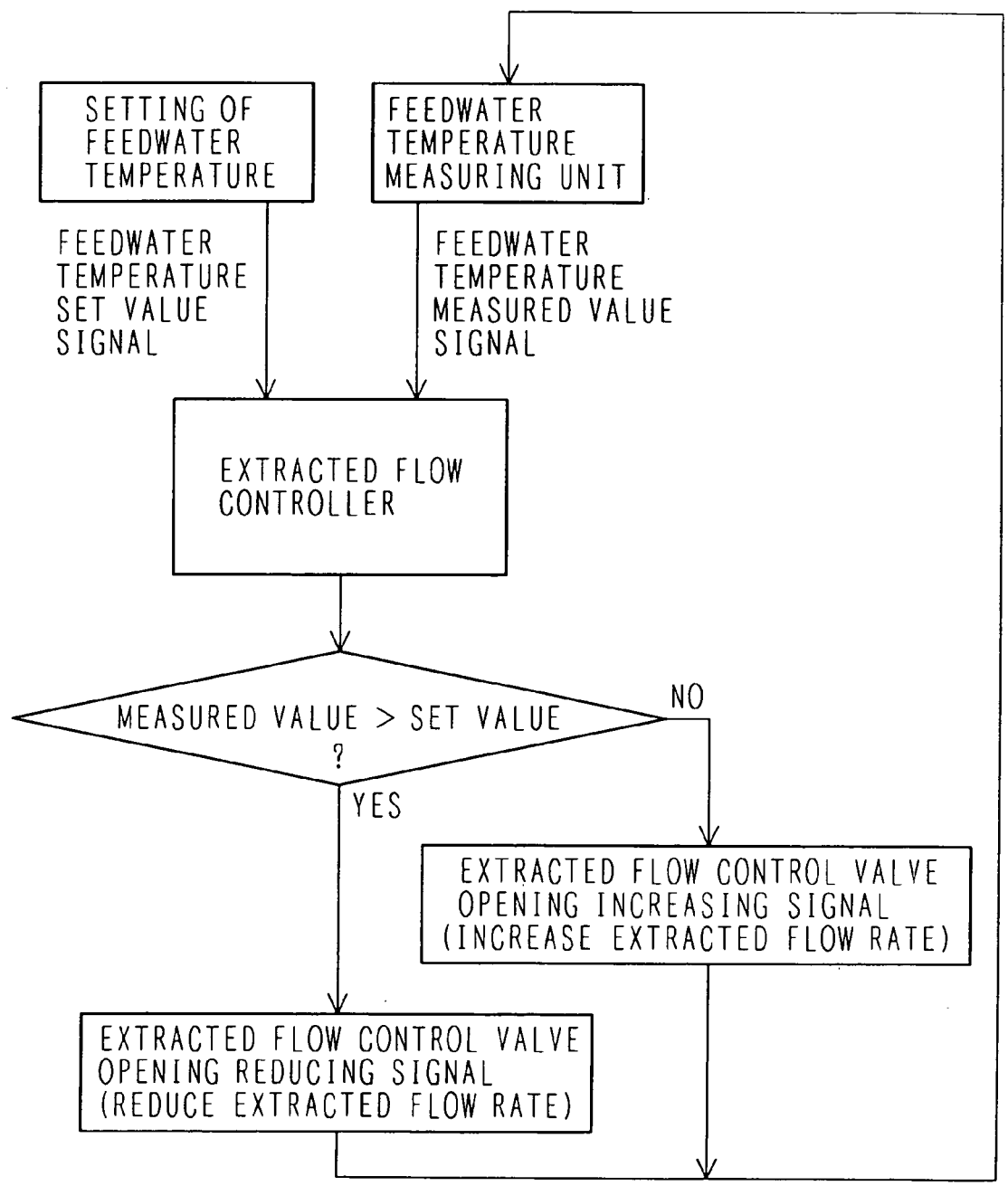
FIG. 9 is a flowchart showing control logic in an extracted flow rate controller shown in FIG. 8.

Another embodiment of the present invention in which the invention is applied to the boiling water reactor power plant as one of nuclear power plants will be described below with reference to FIGS. 8 and 9. The same components as those in the first embodiment are denoted by the same numerals.

As in the first embodiment, he boiling water reactor power plant of this embodiment comprises a reactor pressure vessel 1, a main steam line 2, a high pressure turbine 3 and a low pressure turbine 5 connected to the main steam line 2 in series, and a moisture separator 4 (or a moisture separator and heater) disposed in the main steam line 2 between the high pressure turbine 3 and the low pressure turbine 5. A low pressure feedwater heater 7, a feedwater pump 8, and a high pressure feedwater heater 9 are installed in a feedwater system 23 downstream of a condenser 6.

When the reactor thermal power is uprated, the flow rate of the feedwater has to be increased or the enthalpy difference of the coolant between the inlet and the outlet of the reactor pressure vessel 1 has to be increased in order to remove heat that has increased in amount corresponding to the power uprate. The known power uprating method employs the former manner; namely it increases the flow rate of the feedwater in proportion to the reactor thermal power. On the other hand, as a new power uprating method, there is also proposed a method of suppressing increases of both the flow rate of the main steam and the flow rate of the feedwater in the power uprate operation based on the latter manner by intentionally reducing the coolant enthalpy (temperature) at the inlet of the reactor pressure vessel, to thereby increase the enthalpy difference between the inlet and the outlet of the reactor pressure vessel. This embodiment is adapted for such a new power uprating method and requires additional equipment for widening a feedwater temperature controllable range so that the feedwater temperature is lowered to a value beyond the range estimated in the stage of plant construction.

The necessity of widening the feedwater temperature controllable range toward the lower temperature side in turn requires the flow rate of steam extracted for heating the feedwater to be reduced in comparison with that before the power uprate. The steam extracted from the high pressure turbine 3 for heating the feedwater is introduced to the high pressure feedwater heater 9 via extraction lines 25 and 26. Also, the steam extracted from the low pressure turbine 5 is sent to the low pressure feedwater heater 7 via an extraction line 28. An extracted flow control valve 38 is disposed in the extraction line 25 to adjust the flow rate of the extracted steam. In the boiling water reactor power plant of this embodiment, a plurality of main extraction lines are installed downstream of the inlet of the high pressure turbine and upstream of the outlet of the low pressure turbine.

In the boiling water reactor power plant of this embodiment to which the above-mentioned new power uprating method is applied, it is important that the feedwater temperature be surely lowered to a preset value. For that reason, a feedwater temperature sensor 39 is disposed in the feedwater system 23 downstream of the high pressure feedwater heater 9 that is located most downstream in the feedwater system 23. The feedwater temperature sensor 39 measures the temperature of the feedwater discharged from the high pressure feedwater heater 9 and outputs a feedwater temperature measured value signal 41. An extracted flow controller 40 controls the opening of the extracted flow control valve 38 to adjust the flow rate of the extracted steam. The feedwater temperature sensor 39 is disposed in the feedwater system 23 downstream of the high pressure feedwater heater 9, to which the extracted steam is supplied at the adjusted flow rate, and upstream of the inlet of the reactor pressure vessel 1. Alternatively, the feedwater temperature sensor 39 may be disposed between the high pressure feedwater heater 9 and another suitable feedwater heater installed downstream of the former.

One example of control logic executed by the extracted flow controller 40 in the second embodiment will be described below with reference to FIG. 9. The extracted flow controller 40 receives the feedwater temperature measured value signal 41 outputted from the feedwater temperature sensor 39 and a feedwater temperature set value signal 42. Based on the feedwater temperature measured value signal 41 and the feedwater temperature set value signal 42, the extracted flow controller 40 produces an opening demand signal 43 and outputs the opening demand signal 43 to the extracted flow control valve 38. If the measured value of the feedwater temperature is lower than the set value of the feedwater temperature, this means that the flow rate of the extracted steam is insufficient. Therefore, the extracted flow controller 40 outputs the opening demand signal 43 to increase the opening of the extracted flow control valve 38. Conversely, if the measured value of the feedwater temperature is higher than the set value, this means that the flow rate of the extracted steam is too large. Therefore, the extracted flow controller 40 outputs the demand signal 43 to reduce the opening of the extracted flow control valve 38.

According to this embodiment, since the feedwater temperature can be adjusted to the set value through control of the opening of the extracted flow control valve 38, it is possible to suppress variations in the amount of power generated during the power uprate operation of the nuclear power plant.

Also, according to this embodiment, since the feedwater temperature can be always held at the set value, it is possible to suppress the increases of both the flow rate of the main steam and the flow rate of the feedwater by lowering the feedwater temperature in the power uprate operation of the reactor. Further, since the feedwater temperature can be adjusted in real time, even in the case of changing the thermal power of the nuclear power plant, the operation method of this embodiment is adaptable for the load following operation of the nuclear power plant by modifying the set value of the feedwater temperature depending on the change of the thermal power, while the flow rate of the main steam and the flow rate of the feedwater are held constant.

Third Embodiment

Figure 10:
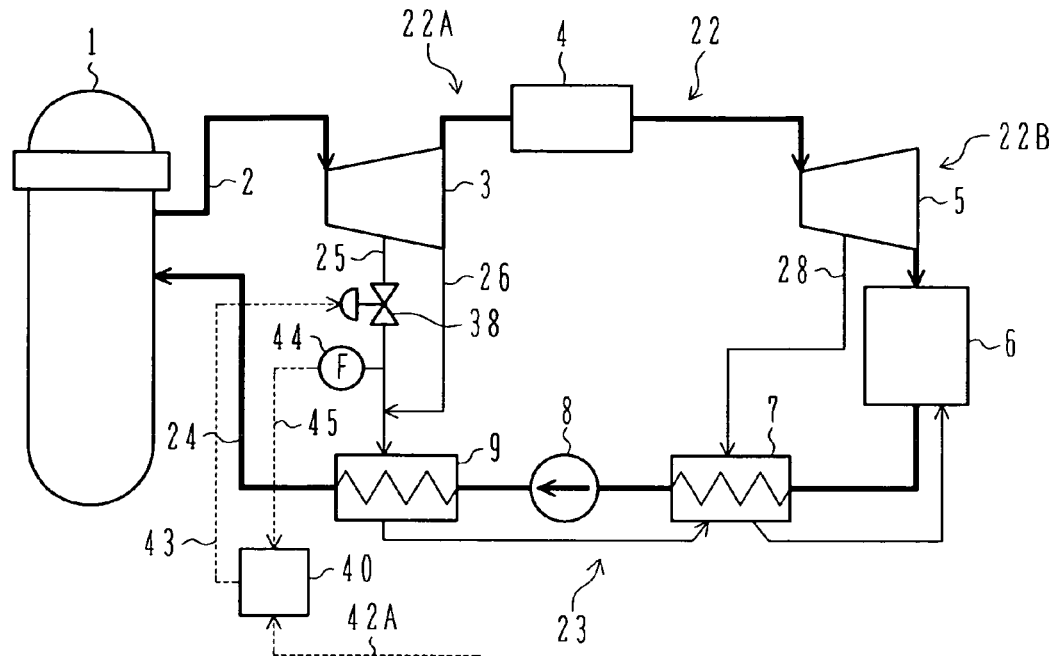
FIG. 10 is a schematic view of a boiling water reactor power plant according to a third embodiment of the present invention.

A boiling water reactor power plant according to still another embodiment (third embodiment) of the present invention will be described below with reference to FIG. 10.

This third embodiment differs from the second embodiment in that, instead of the feedwater temperature sensor 39, an extraction flowmeter 44 is disposed in the extraction line 25 in which the extracted flow control valve 38 is disposed. The extracted flow controller 40 receives a measured value from the extraction flowmeter 44 and a set value of the flow rate of the extracted steam. The extraction flowmeter 44 measures the flow rate of the extracted steam supplied to the high pressure feedwater heater 9. The extracted flow control valve 38 and the extraction flowmeter 44 may be disposed in the extraction line 25 irrespective of which one of them is positioned upstream of the other. When the extraction line 25 is merged midway with another extraction line (e.g., the extraction line 26), one of the extracted flow control valve 38 and the extraction flowmeter 44, which is positioned on the downstream side, may be disposed in the extraction line 25 downstream of the merging point between the two extraction lines. Also, when the extraction line 25 is branched midway, one of the extracted flow control valve 38 and the extraction flowmeter 44, which is positioned on the downstream side, may be disposed in a line after being branched. If the reactor thermal power, the flow rate of the feedwater, and the flow rate of the extracted steam are known, the feedwater temperature is uniquely decided from the heat balance of the nuclear power plant. Accordingly, measuring the flow rate of the extracted steam by the extraction flowmeter 44 disposed in the extraction line 25, as in this embodiment, is equivalent to measurement of the feedwater temperature.

In this embodiment, the extracted flow controller 40 receives an extracted flow measured value signal 45 outputted from the extraction flowmeter 44 and a set value signal 42A for the flow rate of the extracted steam. Based on the extracted flow measured value signal 45 and the extracted flow set value signal 42A, the extracted flow controller 40 outputs an opening demand signal 43 for the extracted flow control valve 38. The opening of the extracted flow control valve 38 is controlled in accordance with the opening demand signal 43. If the measured value of the flow rate of the extracted steam is smaller than the set value of the flow rate of the extracted steam, this means that the flow rate of the extracted steam is insufficient. Therefore, the extracted flow controller 40 outputs the opening demand signal 43 to increase the opening of the extracted flow control valve 38. Conversely, if the measured value of the flow rate of the extracted steam is larger than the set value, this means that the flow rate of the extracted steam is too large. Therefore, the extracted flow controller 40 outputs the opening demand signal 43 to reduce the opening of the extracted flow control valve 38. This third embodiment can also provide similar advantages to those obtainable with the second embodiment.

Fourth Embodiment

Figure 11:
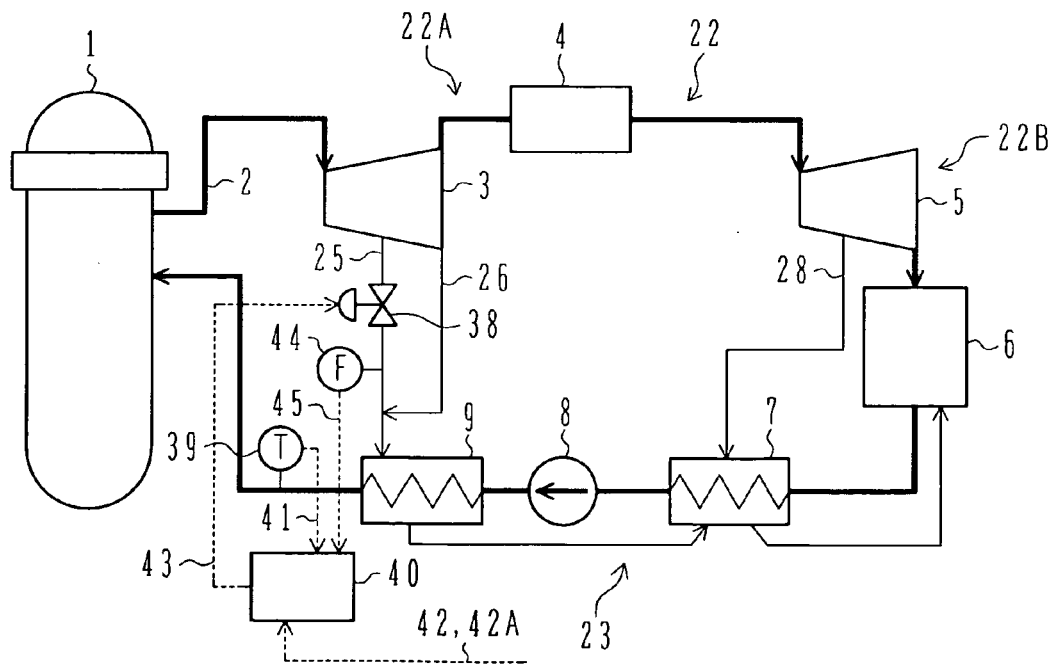
FIG. 11 is a schematic view of a boiling water reactor power plant according to a fourth embodiment of the present invention.
Figure 12:
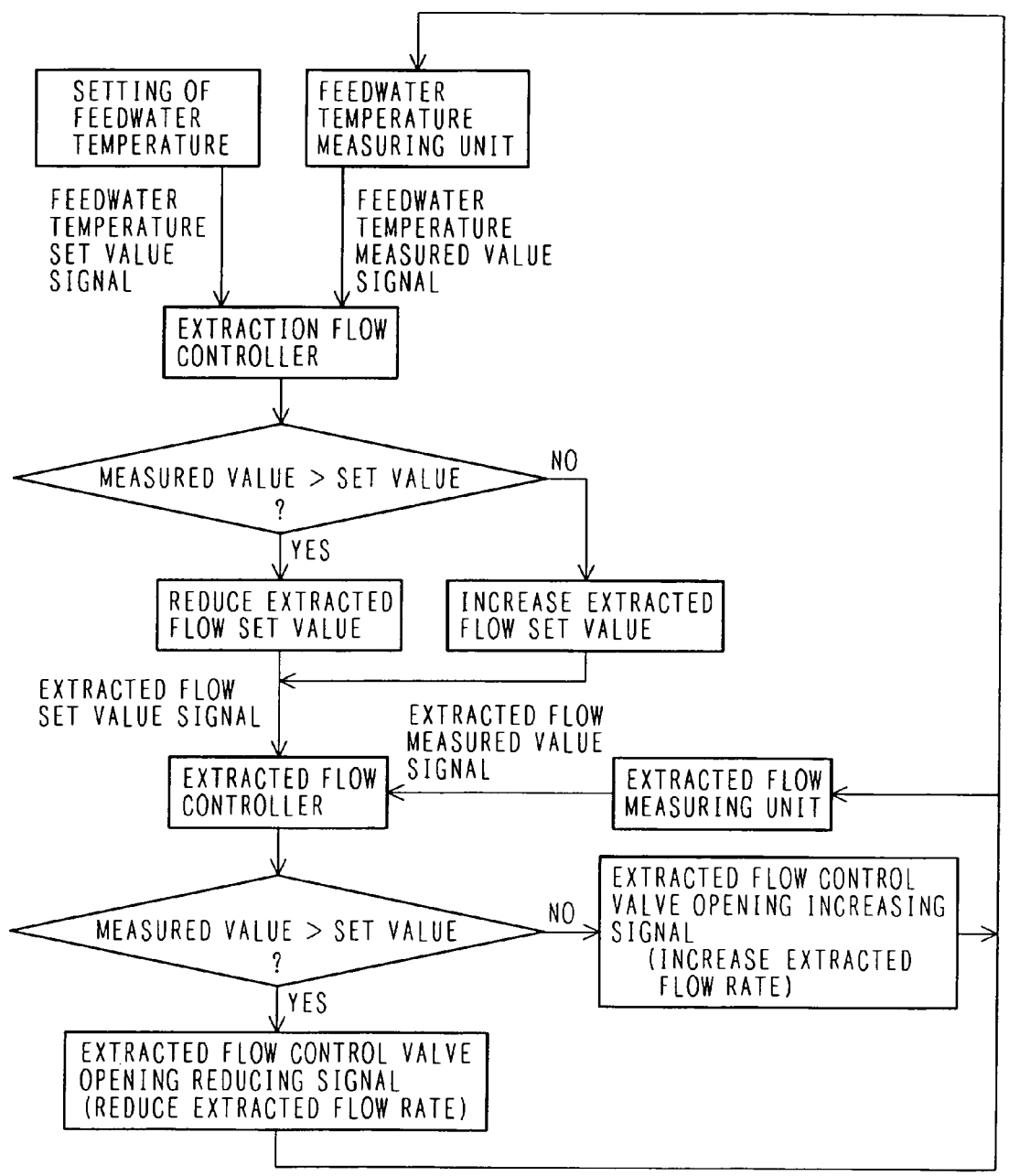
FIG. 12 is a flowchart showing control logic in an extracted flow rate controller shown in FIG. 11.

A boiling water reactor power plant according to still another embodiment (fourth embodiment) of the present invention will be described below with reference to FIG. 11. In this fourth embodiment, both the technical ideas of the second and third embodiments are combined with each other. More specifically, the feedwater temperature sensor 39 is disposed in the feedwater system 23 as in the second embodiment, and the extraction flowmeter 44 is disposed in the extraction line 25 as in the third embodiment. With such an arrangement, the extracted flow controller 40 in this fourth embodiment performs the control based on the flow rate of the extracted steam and the control based on the feedwater temperature. FIG. 12 shows one example of control logic used in this fourth embodiment. A certain time delay occurs from adjustment of the extracted flow control valve 38 to actual change of the feedwater temperature. In this embodiment, therefore, the control based on the flow rate of the extracted steam is performed with priority when the flow rate of the extracted steam is fluctuated at a short cycle, and the control based on the feedwater temperature is performed with priority when the feedwater temperature continues to lower or rise for a relatively long time. In practice, as shown in FIG. 12, the set value of the flow rate of the extracted steam is determined through the control based on the feedwater temperature, and the opening command signal 43 for the extracted flow control valve 38 is outputted based on the difference between the determined set value and the measured value of the flow rate of the extracted steam. This fourth embodiment can also provide similar advantages to those obtainable with the second embodiment.

Fifth Embodiment

Figure 13:
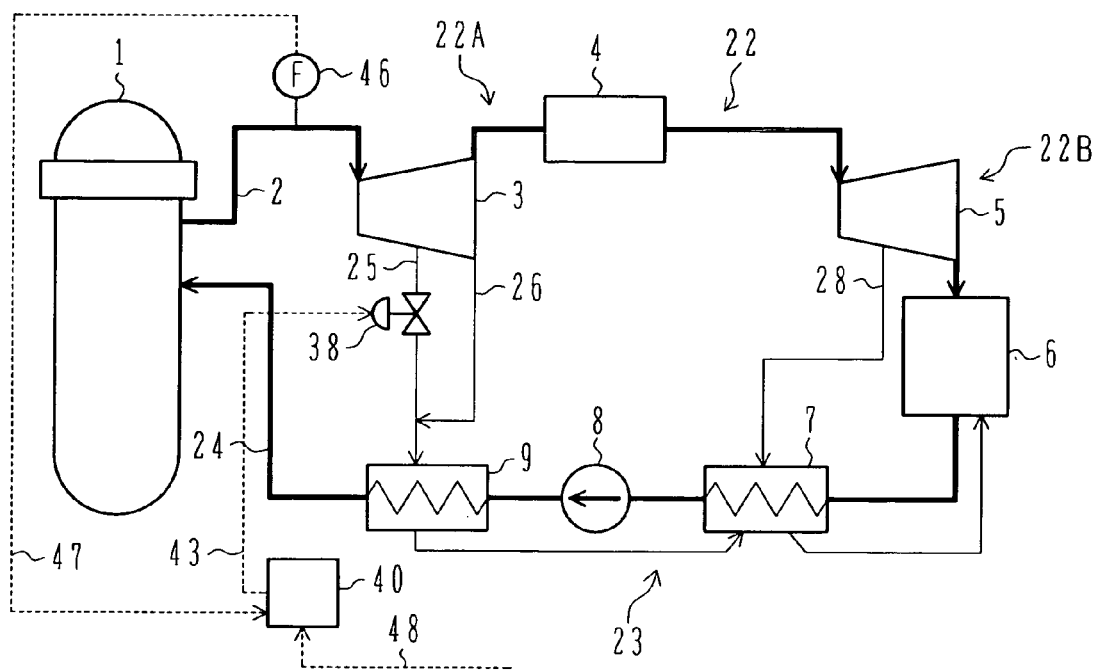
FIG. 13 is a schematic view of a boiling water reactor power plant according to a fifth embodiment of the present invention.

A boiling water reactor power plant according to still another embodiment (fifth embodiment) of the present invention will be described below with reference to FIG. 13.

In this fifth embodiment, a main steam flowmeter 46 is disposed in the main steam system 2 between the reactor pressure vessel 1 and the high pressure turbine 3. If the reactor thermal power and the flow rate of the main steam are known, the feedwater temperature is uniquely decided from the heat balance of the nuclear power plant. Accordingly, measuring the flow rate of the main steam by the main steam flowmeter 46 disposed in the main steam system 22, as in this fifth embodiment, is equivalent to the measurement of the feedwater temperature in the second embodiment. The arrangement of this fifth embodiment is similar to that of the second embodiment except that the main steam flowmeter 46 is disposed instead of the feedwater temperature sensor 39 and the extracted flow controller 40 controls the extracted flow control valve 38 in accordance with the measured value from the main steam flowmeter 46.

In this embodiment, the extracted flow controller 40 receives a main-steam flow measured value signal 47 outputted from the main steam flowmeter 46 and a set value signal 48 for the flow rate of the main steam. Then, the extracted flow controller 40 produces an opening demand signal 43 based on those two signals and outputs it to the extracted flow control valve 38. If the measured value of the flow rate of the main steam is smaller than the set value of the flow rate of the main steam, this means that the feedwater temperature is too low, namely the flow rate of the extracted steam is insufficient. Therefore, the extracted flow controller 40 outputs the opening demand signal 43 to increase the opening of the extracted flow control valve 38. Conversely, if the measured value of the flow rate of the main steam is larger than the set value, this means that the feedwater temperature is too high, namely the flow rate of the extracted steam is too large. Therefore, the extracted flow controller 40 outputs the opening demand signal 43 to reduce the opening of the extracted flow control valve 38. This fifth embodiment can also provide similar advantages to those obtainable with the second embodiment.

Sixth Embodiment

Figure 14:
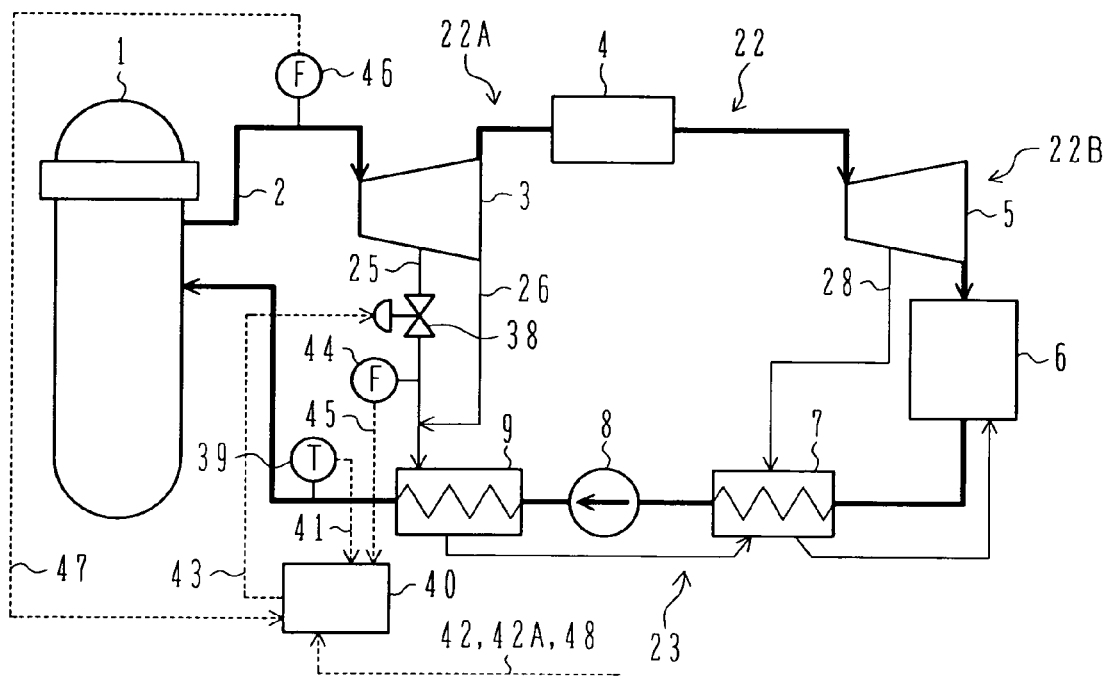
FIG. 14 is a schematic view of a boiling water reactor power plant according to a sixth embodiment of the present invention.
Figure 15:
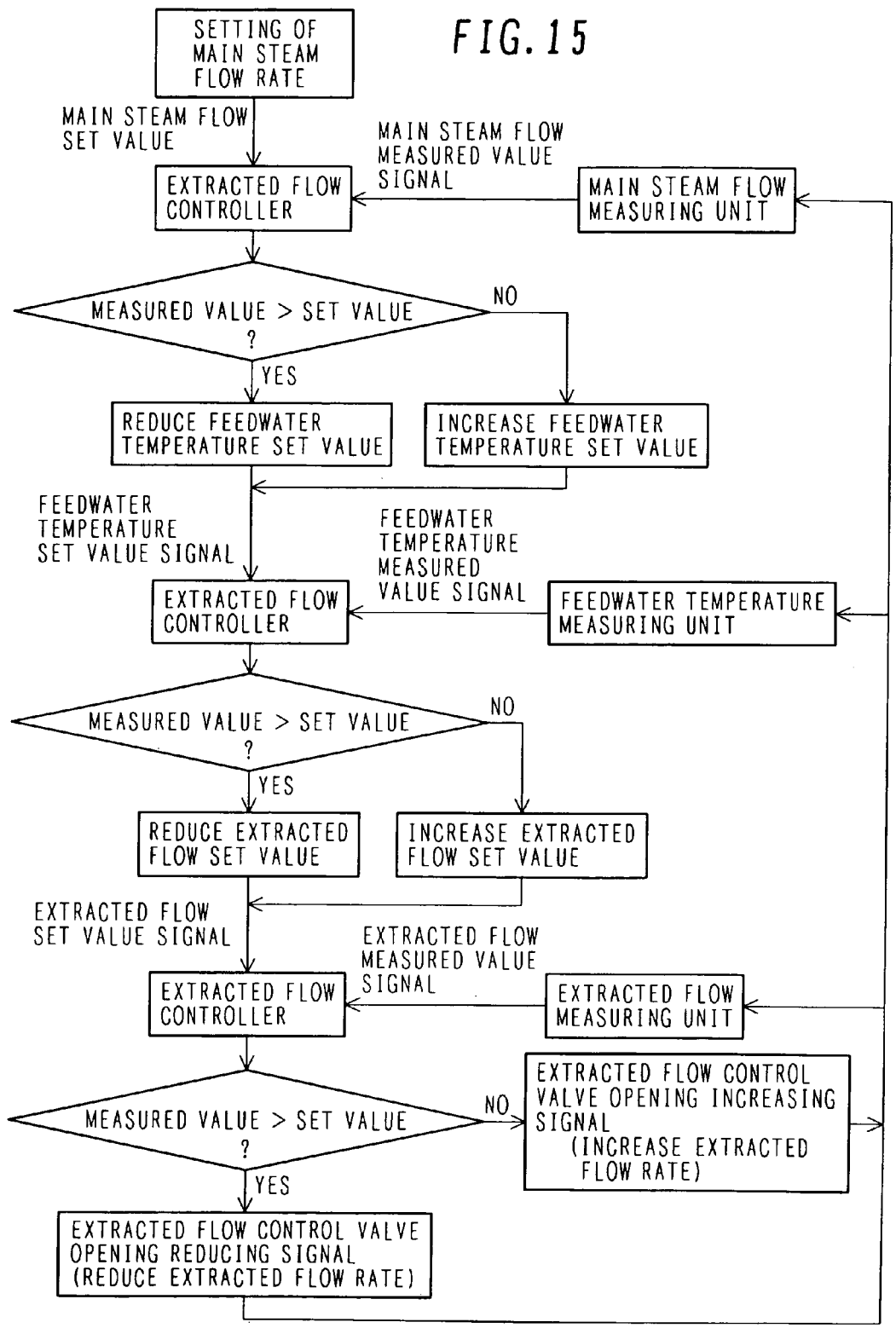
FIG. 15 is a flowchart showing control logic in an extracted flow rate controller shown in FIG. 14.

A boiling water reactor power plant according to still another embodiment (sixth embodiment) of the present invention will be described below with reference to FIG. 14. In this sixth embodiment, the technical ideas of the second, third and fifth embodiments are combined together. More specifically, the feedwater temperature sensor 39 is disposed in the feedwater system 23 as in the second embodiment, the extraction flowmeter 44 is disposed in the extraction line 25 as in the third embodiment, and the main steam flowmeter 46 is disposed in the main steam system 2 as in the fifth embodiment. With such an arrangement, the extracted flow controller 40 in this sixth embodiment performs the control based on the flow rate of the main steam, the control based on the flow rate of the extracted steam, and the control based on the feedwater temperature. FIG. 15 shows one example of control logic used in this sixth embodiment. A certain time delay occurs from adjustment of the extracted flow control valve 38 to actual change of the flow rate of the main steam, and another certain time delay also occurs, though being shorter than the time delay regarding the flow rate of the main steam, from adjustment of the extracted flow control valve 38 to actual change of the feedwater temperature. On the other hand, a time delay from adjustment of the extracted flow control valve 38 to actual change of the flow rate of the extracted flow is short. In this embodiment, therefore, the control based on the flow rate of the extracted steam is performed with priority when the flow rate of the extracted steam is fluctuated at a short cycle, and the control based on the feedwater temperature is performed with priority when the feedwater temperature continues to lower or rise for a relatively long time. Further, the control based on the flow rate of the main steam is performed with priority when the flow rate of the main steam continues to increase or reduce for a relatively long time. In practice, as shown in FIG. 15, the set value of the feedwater temperature is determined through control based on the flow rate of the main steam, and the set value of the flow rate of the extracted steam is determined based on the difference between the determined set value and the measured value of the feedwater temperature. Then, the opening demand signal 43 for the extracted flow control valve 38 is outputted based on the difference between the determined set value and the measured value of the flow rate of the extracted steam. This sixth embodiment can also provide similar advantages to those obtainable with the second embodiment.

Instead of the above-described arrangement, the main steam flowmeter 46 and the feedwater temperature sensor 39 may be disposed to perform the control based on the flow rate of the main steam and the control based on the feedwater temperature. Further, the main steam flowmeter 46 and the extraction flowmeter 44 may be disposed to perform the control based on the flow rate of the main steam and the control based on the flow rate of the extracted steam.

Generally, when the flow rate of the extracted steam is reduced to lower the feedwater temperature, the thermal efficiency of the plant is reduced. In order to suppress such a reduction of the thermal efficiency, it is preferable to reduce the flow rate of the steam extracted from the extraction point that is positioned as close as possible to the uppermost side. Therefore, a greater effect can be obtained by installing the extracted flow control valve 38 in the extraction line for extracting the steam from a point downstream of the inlet of the high pressure turbine and upstream of the inlet of the lower pressure turbine. While the extracted flow control valve 38 is disposed only in one extraction line in the second to sixth embodiments, the feedwater temperature cannot be sufficiently lowered in some cases by reducing the flow rate of the extracted steam through only one extraction line. In such a case, the extracted flow control valve 38 is disposed in plural extraction lines.

In the boiling water reactor power plant, as mentioned above, uprate of the reactor thermal power up to about 102% is generally feasible just by increasing the measurement accuracy of the feedwater flowmeter 39, etc., and the feedwater temperature is not required to be lowered in such an uprate range. In the boiling water reactor power plant, therefore, the control of the feedwater temperature described in the second to sixth embodiments is more effective when applied to the case of uprating the reactor thermal power in the range of larger than 102%, but smaller than 105%. Further, at the uprate of the nuclear thermal power in the range of 105% to 120%, substantial change of system equipment, e.g., replacement of the high pressure turbine 3, is not required in general. The effects of those embodiments are especially noticeable when applied to the uprate of the reactor thermal power in excess of 105% because the replacement of the high pressure turbine 3 is not required even in the power uprate operation in excess of 105% by employing the power uprating method of lowering the feedwater temperature according to the present invention.

Seventh Embodiment

While the second to sixth embodiments have been described in connection with the case where the power uprating method of lowering the feedwater temperature is applied to the boiling water reactor power plant, the following description is made of an example in which the power uprating method is applied to a pressurized water reactor power plant as one of reactor power plants.

Figure 16:
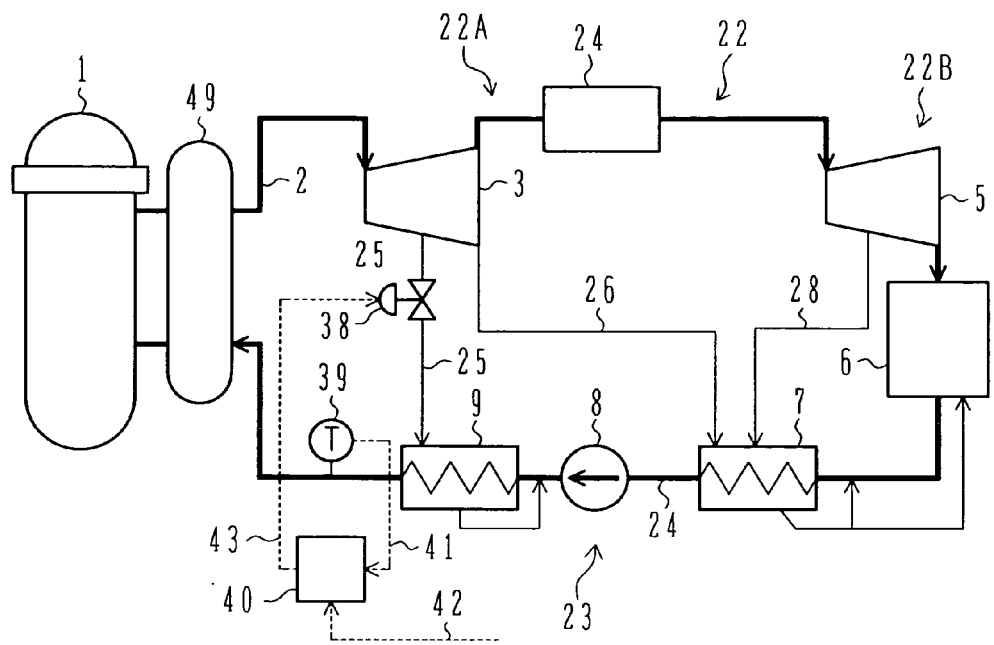
FIG. 16 is a schematic view of a pressurized water reactor power plant according to a seventh embodiment of the present invention.

The pressurized water reactor power plant according to still another embodiment (seventh embodiment) of the present invention will be described below with reference to FIG. 16. Feedwater temperature control logic used in this seventh embodiment is the same as that shown in FIG. 9.

In this seventh embodiment, a steam generator 49 is newly installed in addition to the construction of the second embodiment such that a primary loop and a secondary loop are formed. The primary loop is a circulation loop starting from the reactor pressure vessel 1, passing the steam generator 49, and returning to the reactor pressure vessel 1. The secondary loop is formed by connecting both the main steam system 2 and the feedwater system 23 in the second embodiment to the steam generator 49. The high-temperature coolant generated from the reactor pressure vessel 1 is supplied to the steam generator 49 and is returned to the reactor pressure vessel 1 after the coolant temperature has been lowered. In the steam generator 49, the feedwater supplied from the feedwater system 23 is heated by the high-temperature coolant to become steam. The secondary steam delivered from the steam generator 49 is introduced to the high-pressure turbine 3, the moisture separator and heater 24, and the low-pressure turbine 5 through the main steam line 2. The steam discharged from the low-pressure turbine 5 is condensed by the condenser 6 to become water. This water is fed to the steam generator 49 through the feedwater system 23 in which the low pressure feedwater heater 7, the feedwater pump 8, and the high pressure feedwater heater 9 are disposed. Note that one operation cycle is defined as a period from startup of the reactor to the time at which the reactor is shut down for fuel exchange.

When the reactor thermal power is uprated, the amount of heat exchange in the steam generator 49 is increased substantially proportional to the amount of increase of the reactor thermal power. In order to offset the amount of heat exchange in the steam generator 49, the flow rate of the feedwater supplied to the steam generator 49 has to be increased or the enthalpy difference of the coolant between the inlet and the outlet of the steam generator 49 has to be increased. The known power uprating method employs the former manner; namely it increases the flow rate of the feedwater in proportion to the amount of heat exchange in the steam generator 49. On the other hand, this embodiment employs the latter manner, i.e., the new power uprating method. More specifically, in this embodiment, increases of both the flow rate of the main steam and the flow rate of the feedwater in the power uprate operation are suppressed by intentionally reducing the coolant enthalpy (temperature) at the inlet of the steam generator 49, to thereby increase the enthalpy difference between the inlet and the outlet of the steam generator 49. Thus, this embodiment is adapted for the new power uprating method and requires additional equipment for widening a feedwater temperature controllable range so that the feedwater temperature is lowered to a value beyond the range estimated in the stage of plant construction.

The necessity of widening the feedwater temperature controllable range toward the lower temperature side in turn requires the flow rate of steam extracted for heating the feedwater to be reduced in comparison with that before the power uprate. The extracted steam for heating the feedwater is extracted from the main steam system 2 including the high pressure turbine 3 and the low pressure turbine 5, and is introduced to the high pressure feedwater heater 9 and the low pressure feedwater heater 7 via the extraction lines 25, 26 and 28, etc. In the pressurized water reactor power plant of this embodiment, a plurality of main extraction lines are installed downstream of the inlet of the high pressure turbine and upstream of the outlet of the low pressure turbine. To reduce the flow rate of the extracted steam, an extracted flow control valve 38 is disposed in the extraction line 25 to adjust the flow rate of the extracted steam.

When the above-mentioned new power uprating method of increasing the enthalpy difference of the coolant is employed, it is important that the feedwater temperature be surely lowered to a preset value. For that reason, as in the second embodiment, a feedwater temperature sensor 39 is disposed in the feedwater system 23 downstream of the high pressure feedwater heater 9 that is located most downstream in the feedwater system 23, and the opening of the extracted flow control valve 38 is controlled to adjust the flow rate of the extracted steam. The feedwater temperature sensor 39 is disposed in the feedwater system 23 downstream of the high pressure feedwater heater 9, to which the extracted steam is supplied at the controlled flow rate, and upstream of the inlet of the steam generator 28. As an alternative, the feedwater temperature sensor 39 may be disposed between the high pressure feedwater heater 9, to which the extracted steam is supplied at the controlled flow rate, and another suitable feedwater heater installed downstream of the former. Further, the sensor 39 may be disposed between an outlet of a high pressure feedwater heater installed most downstream and an inlet of the steam generator 49.

One example of control logic executed by the extracted flow controller 40 in the seventh embodiment will be described below with reference to FIG. 9. As in the second embodiment, the extracted flow controller 40 controls the opening of the extracted flow control valve 38 in accordance with the feedwater temperature measured value signal 41 and the feedwater temperature set value signal 42, thereby controlling the flow rate of the extracted steam for heating the feedwater, which is supplied to the high pressure feedwater heater 9.

According to this embodiment, since the feedwater temperature can be adjusted to the set value through control of the opening of the extracted flow control valve 38, it is possible to suppress variations in the amount of power generated during the power uprate operation of the nuclear power plant.

Also, according to this embodiment, since the feedwater temperature can be always held at the set value, it is possible to suppress the increases of both the flow rate of the main steam and the flow rate of the feedwater by lowering the feedwater temperature in the power uprate operation of the reactor. Further, since the feedwater temperature can be adjusted in real time, the operation method of this embodiment is adaptable for the load following operation of the nuclear power plant, as with the second embodiment, while the flow rate of the main steam and the flow rate of the feedwater are held constant.

Eighth Embodiment

Figure 17:
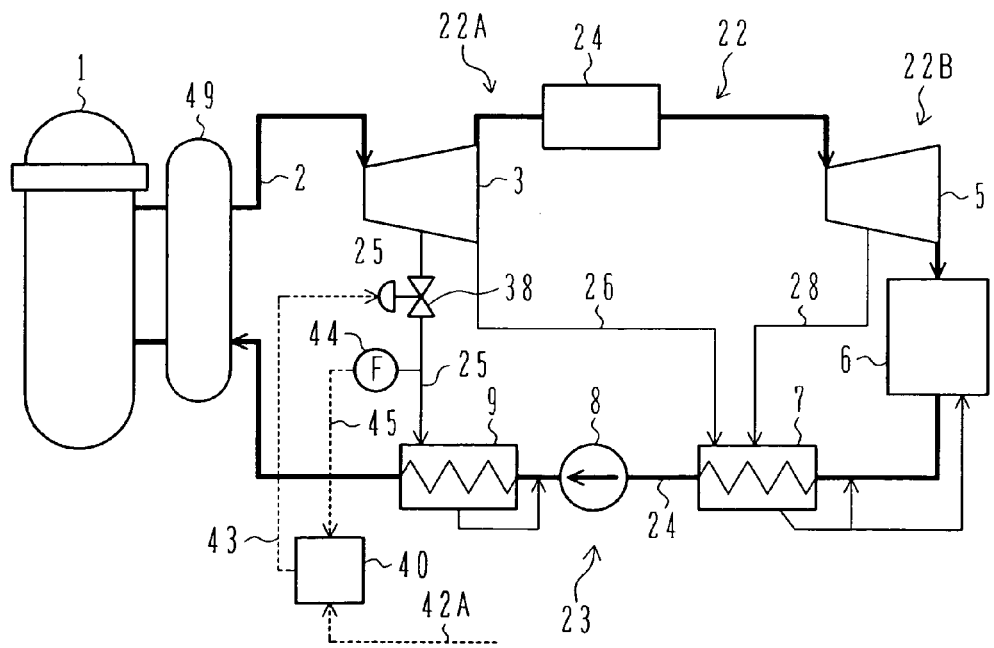
FIG. 17 is a schematic view of a pressurized water reactor power plant according to an eighth embodiment of the present invention.

A pressurized water reactor power plant according to still another embodiment (eighth embodiment) of the present invention will be described below with reference to FIG. 17.

As in the third embodiment, this eighth embodiment includes, instead of the feedwater temperature sensor 39, an extraction flowmeter 44 disposed in the extraction line 25 in which the extracted flow control valve 38 is disposed. Comparing with the arrangement of the seventh embodiment that the extracted flow controller 40 controls the extracted flow control valve 38 in accordance with the measured value from the feedwater temperature sensor 39, this eighth embodiment is modified such that the extracted flow controller 40 controls the extracted flow control valve 38 in accordance with the measured value from the extraction flowmeter 44.

The extracted flow control valve 38 and the extraction flowmeter 44 may be disposed in the extraction line 25 irrespective of which one of them is positioned upstream of the other. When the extraction line 25 is merged midway with another extraction line, one of the extracted flow control valve 38 and the extraction flowmeter 44, which is positioned on the downstream side, may be disposed in the extraction line 25 downstream of the merging point between the two extraction lines. Also, when the extraction line 25 is branched midway, one of the extracted flow control valve 38 and the extraction flowmeter 44, which is positioned on the downstream side, may be disposed in a line after being branched. If the reactor thermal power, the flow rate of the feedwater, and the flow rate of the extracted steam are known, the feedwater temperature is uniquely decided from the heat balance of the nuclear power plant.

As in the third embodiment, the extracted flow controller 40 controls the opening of the extracted flow control valve 38 in accordance with the extracted flow measured value signal 45 and the extracted flow set value signal 42A. This eighth embodiment can also provide similar advantages to those obtainable with the seventh embodiment.

Ninth Embodiment

Figure 18:
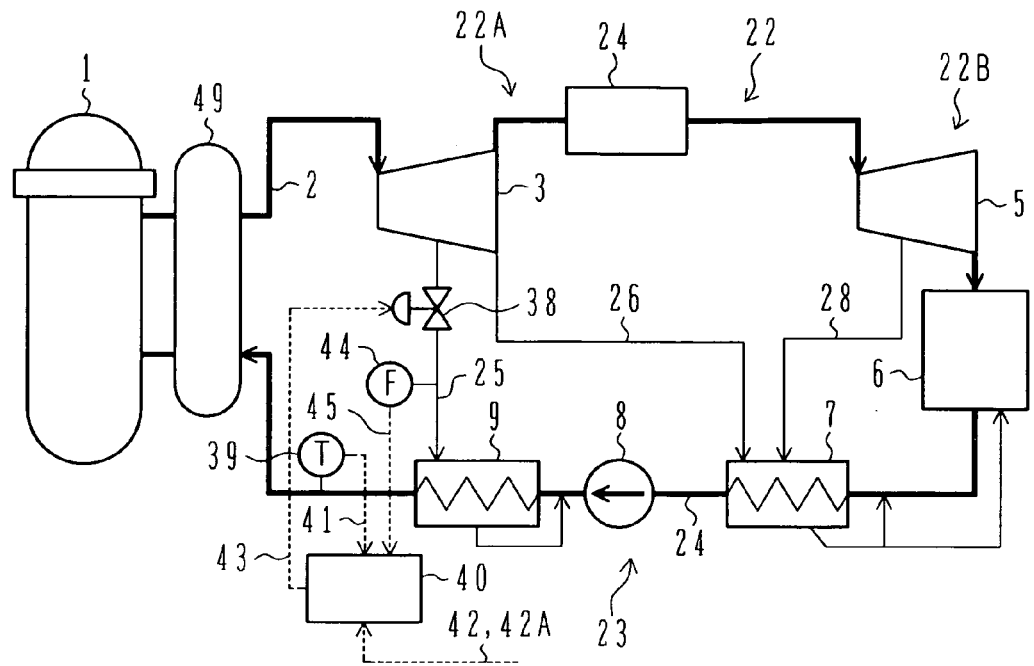
FIG. 18 is a schematic view of a pressurized water reactor power plant according to a ninth embodiment of the present invention.

A pressurized water reactor power plant according to still another embodiment (ninth embodiment) of the present invention will be described below with reference to FIG. 18. In this ninth embodiment, both the technical ideas of the seventh and eighth embodiments are combined with each other. More specifically, the feedwater temperature sensor 39 is disposed in the feedwater system 23 as in the seventh embodiment, and the extraction flowmeter 44 is disposed in the extraction line 25 as in the eighth embodiment. With such an arrangement, the extracted flow controller 40 in this seventh embodiment performs the control based on the flow rate of the extracted steam and the control based on the feedwater temperature. Control logic used in this ninth embodiment is the same as that used in the fourth embodiment and shown in FIG. 12. A certain time delay occurs from adjustment of the extracted flow control valve 38 to actual change of the feedwater temperature. In this embodiment, therefore, the control based on the flow rate of the extracted steam is performed with priority when the flow rate of the extracted steam is fluctuated at a short cycle, and the control based on the feedwater temperature is performed with priority when the feedwater temperature continues to lower or rise for a relatively long time. In practice, as shown in FIG. 12, the set value of the flow rate of the extracted steam is determined through the control based on the feedwater temperature, and the opening demand signal 43 for the extracted flow control valve 38 is outputted based on the difference between the determined set value and the measured value of the flow rate of the extracted steam. This ninth embodiment can also provide similar advantages to those obtainable with the seventh embodiment.

Tenth Embodiment

Figure 19:
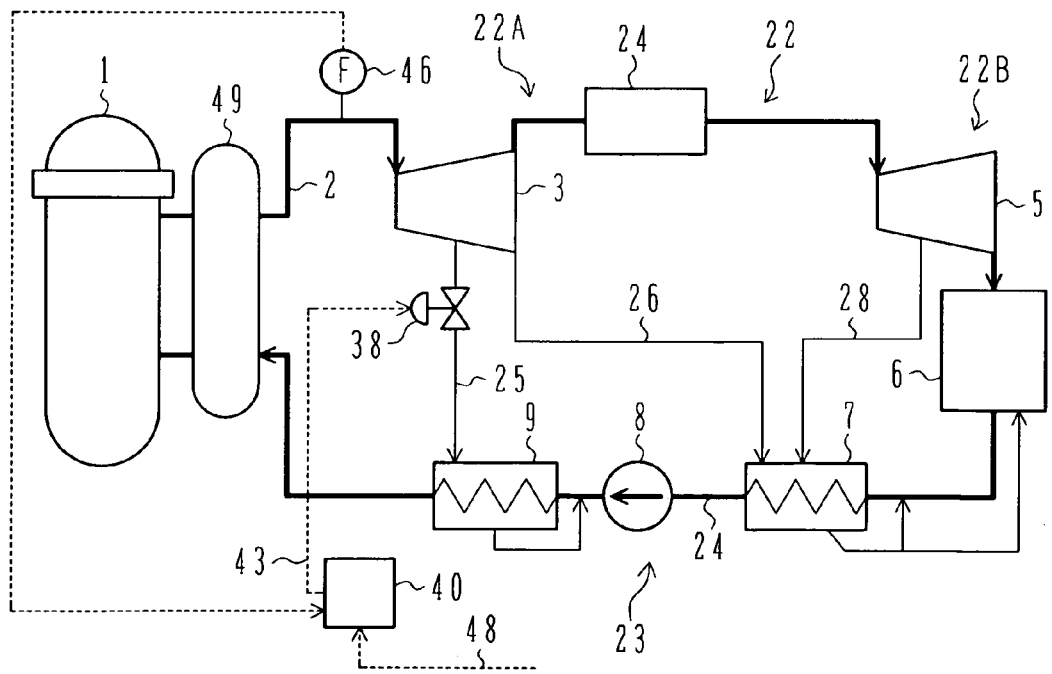
FIG. 19 is a schematic view of a pressurized water reactor power plant according to a tenth embodiment of the present invention.

A pressurized water reactor power plant according to still another embodiment (tenth embodiment) of the present invention will be described below with reference to FIG. 19. This tenth embodiment employs the main steam flowmeter 46 used in the fifth embodiment. The main steam flowmeter 46 is disposed in the main steam system 2 downstream of the steam generator 49 and upstream of the inlet of the high pressure turbine 3. Comparing with the arrangement of the seventh embodiment that the extracted flow controller 40 controls the extracted flow control valve 38 in accordance with the measured value from the feedwater temperature sensor 39, this tenth embodiment is modified such that the extracted flow controller 40 controls the extracted flow control valve 38 in accordance with the measured value from the main steam flowmeter 46.

As in the fifth embodiment, the extracted flow controller 40 receives a main-steam flow measured value signal 47 outputted from the main steam flowmeter 46 and a set value signal 48 for the flow rate of the main steam. Then, the extracted flow controller 40 produces an opening demand signal 43 based on those two signals and controls the extracted flow control valve 38 in accordance with the produced opening demand signal 43. This tenth embodiment can also provide similar advantages to those obtainable with the seventh embodiment.

Eleventh Embodiment

Figure 20:
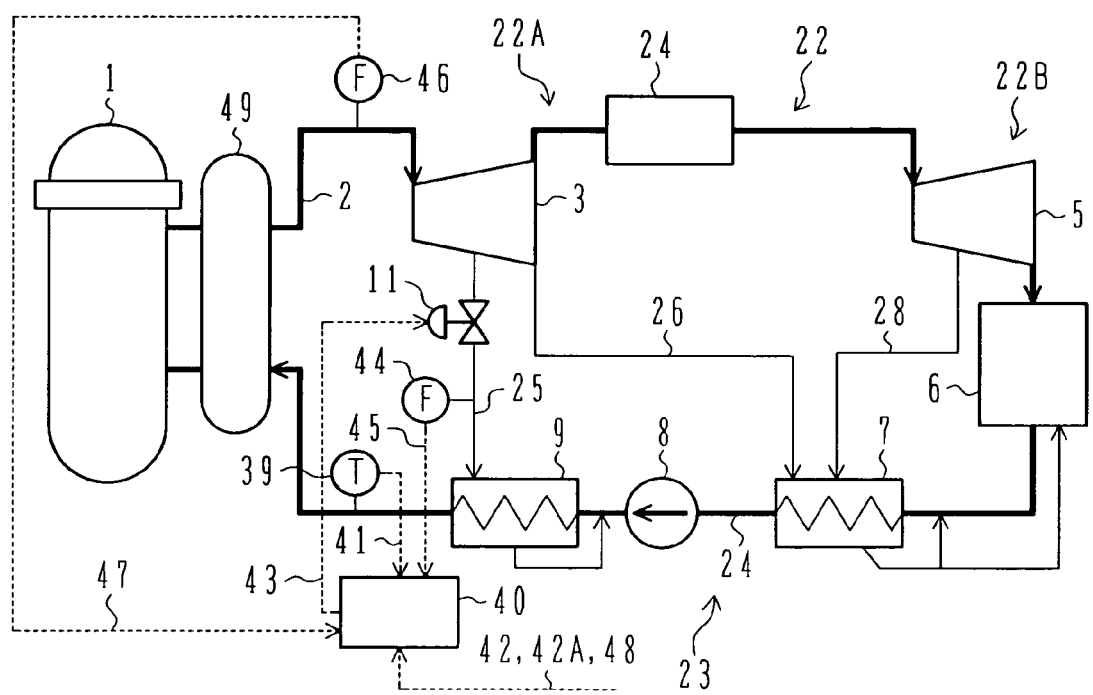
FIG. 20 is a schematic view of a pressurized water reactor power plant according to an eleventh embodiment of the present invention.

A pressurized water reactor power plant according to still another embodiment (eleventh embodiment) of the present invention will be described below with reference to FIG. 20. In this eleventh embodiment, the extraction flowmeter 44 and the main steam flowmeter 46 are added to the arrangement of the seventh embodiment, as in the sixth embodiment. The extraction flowmeter 44 is disposed in the extraction line 25, and the main steam flowmeter 46 is disposed in the main steam system 2 between the steam generator 49 and the high pressure turbine 3. With such an arrangement, the extracted flow controller 40 in this embodiment performs the control based on the feedwater temperature, the control based on the flow rate of the main steam, and the control based on the flow rate of the extracted steam. Control logic used in this embodiment is the same as that shown in FIG. 15, and the extracted flow controller 40 executes the control in the same manner as that in the sixth embodiment. This eleventh embodiment can also provide similar advantages to those obtainable with the seventh embodiment.

Instead of the above-described arrangement, the main steam flowmeter 46 and the feedwater temperature sensor 39 may be disposed to perform the control based on the flow rate of the main steam and the control based on the feedwater temperature. Further, the main steam flowmeter 46 and the extraction flowmeter 44 may be disposed to perform the control based on the flow rate of the main steam and the control based on the flow rate of the extracted steam.

While the seventh, eighth and tenth embodiments of the present invention have been described, by way of example, in connection with the pressurized water reactor, the present invention can also be applied to an indirect-cycle plant other than the pressurized water reactor.

Generally, when the flow rate of the extracted steam is reduced to lower the feedwater temperature, the thermal efficiency of the plant is reduced. In order to suppress such a reduction of the thermal efficiency, it is preferable to reduce the flow rate of the steam extracted from the extraction point that is positioned as possible as close to uppermost side. In the seventh to eleventh embodiments, therefore, a greater effect can be obtained by installing the extracted flow control valve 38 in the extraction line for extracting the steam from a point downstream of the inlet of the high pressure turbine and upstream of the inlet of the lower pressure turbine. While the extracted flow control valve 38 is disposed only in one extraction line in the seventh to eleventh embodiments, the feedwater temperature cannot be sufficiently lowered in some cases if the flow rate of the extracted steam through only one extraction line is reduced. In such a case, the extracted flow control valve 38 is disposed in plural extraction lines.

In the pressurized water reactor power plant, uprate of the reactor thermal power up to about 102% is generally feasible just by increasing the measurement accuracy of the feedwater flowmeter 39, etc., and the feedwater temperature is not required to lowered in such an uprate range, as mentioned above. In the pressurized water reactor power plant, therefore, the control of the feedwater temperature described in the seventh to eleventh embodiments is more effective when applied to the case of uprating the reactor thermal power in the range of larger than 102%, but smaller than 105%. Further, at the uprate of the nuclear thermal power in the range of 105% to 120%, substantial change of system equipment, e.g., replacement of the high pressure turbine 3, is not required in general. The effects of those embodiments are especially noticeable when applied to the uprate of the reactor thermal power in excess of 105% because the replacement of the high pressure turbine 3 is not required even in the power uprate operation in excess of 105% by employing the power uprating method of lowering the feedwater temperature according to the present invention.

What is claimed is:

1. An operation method of a nuclear power plant comprising:
    a nuclear reactor;
    a high pressure steam system supplied with steam generated in said nuclear reactor and extending from an outlet of said nuclear reactor to an inlet of a low pressure turbine via a high pressure turbine;
    a low pressure steam system extending from the inlet of said low pressure turbine to an inlet of a condenser for condensing the steam discharged from said low pressure turbine; and
    a feedwater system including a feedwater heater for heating feedwater supplied from said condenser and introducing the feedwater discharged from said feedwater heater to said nuclear reactor, the operation method comprising the steps of:
    uprating second nuclear thermal power in a second operation cycle of said nuclear reactor from first nuclear thermal power in a first operation cycle before the second operation cycle; and
    reducing a proportion of a mass flow rate of steam extracted from said high pressure steam system and introduced to said feedwater heater in the second operation cycle with respect to a mass flow rate of main steam at the outlet of said nuclear reactor in comparison with a proportion of a mass flow rate of steam extracted from said high pressure steam system and introduced to said feedwater heater in the first operation cycle with respect to the mass flow rate of main steam at the outlet of said nuclear reactor, such that temperature of the feedwater discharged from said feedwater heater lowers in the range of 1° C. to 40° C. in the second operation cycle from the feedwater temperature in the first operation cycle.

2. An operation method of a nuclear power plant comprising:
    a nuclear reactor;
    a high pressure steam system supplied with steam generated in said nuclear reactor and extending from an outlet of said nuclear reactor to an inlet of a low pressure turbine via a high pressure turbine;
    a low pressure steam system extending from the inlet of said low pressure turbine to an inlet of a condenser for condensing the steam discharged from said low pressure turbine; and
    a feedwater system including a feedwater heater for heating feedwater supplied from said condenser and introducing the feedwater discharged from said feedwater heater to said nuclear reactor, the operation method comprising the steps of:
    uprating second nuclear thermal power in a second operation cycle of said nuclear reactor from first nuclear thermal power in a first operation cycle before the second operation cycle; and
    reducing a proportion of a mass flow rate of steam extracted from each of said high pressure steam system and said low pressure steam system and introduced to said feedwater heater in the second operation cycle with respect to a mass flow rate of main steam at the outlet of said nuclear reactor in comparison with a proportion of a mass flow rate of steam extracted from each of said high pressure steam system and said low pressure steam system and introduced to said feedwater heater in the first operation cycle with respect to the mass flow rate of main steam at the outlet of said nuclear reactor, and setting a decrease of the proportion of the mass flow rate of steam extracted from said high pressure steam system in the second operation cycle with respect to the mass flow rate of main steam at the outlet of said nuclear reactor from the proportion in the first operation cycle to be larger than a decrease of the proportion of the mass flow rate of steam extracted from said low pressure steam system in the second operation cycle with respect to the mass flow rate of main steam at the outlet of said nuclear reactor from the proportion in the first operation cycle, such that temperature of the feedwater discharged from said feedwater heater lowers in the range of 1° C. to 40° C. in the second operation cycle from the feedwater temperature in the first operation cycle.

3. An operation method of a nuclear power plant comprising:
   a nuclear reactor;
   a high pressure steam system supplied with steam generated in said nuclear reactor and extending from an outlet of said nuclear reactor to an inlet of a low pressure turbine via a high pressure turbine;
   a low pressure steam system extending from the inlet of said low pressure turbine to an inlet of a condenser for condensing the steam discharged from said low pressure turbine; and
   a feedwater system including a feedwater heater for heating feedwater supplied from said condenser and introducing the feedwater discharged from said feedwater heater to said nuclear reactor, the operation method comprising the steps of:
   uprating second nuclear thermal power in a second operation cycle of said nuclear reactor from first nuclear thermal power in a first operation cycle before the second operation cycle; and
   reducing a mass flow rate of steam extracted from said high pressure steam system and introduced to said feedwater heater in the second operation cycle in comparison with a proportion of a mass flow rate of steam extracted from said high pressure steam system and introduced to said feedwater heater in the first operation cycle, such that temperature of the feedwater discharged from said feedwater heater lowers in the range of 1° C. to 40° C. in the second operation cycle from the feedwater temperature in the first operation cycle.

4. An operation method of a nuclear power plant comprising:
   a nuclear reactor;
   a high pressure steam system supplied with steam generated in said nuclear reactor and extending from an outlet of said nuclear reactor to an inlet of a low pressure turbine via a high pressure turbine;
   a low pressure steam system extending from the inlet of said low pressure turbine to an inlet of a condenser for condensing the steam discharged from said low pressure turbine; and
   a feedwater system including a feedwater heater for heating feedwater supplied from said condenser and introducing the feedwater discharged from said feedwater heater to said nuclear reactor, the operation method comprising the steps of:
   uprating second nuclear thermal power in a second operation cycle of said nuclear reactor from first nuclear thermal power in a first operation cycle before the second operation cycle; and
   reducing a mass flow rate of steam extracted from each of said high pressure steam system and said low pressure steam system and introduced to said feedwater heater in the second operation cycle in comparison with a proportion of a mass flow rate of steam extracted from each of said high pressure steam system and said low pressure steam system and introduced to said feedwater heater in the first operation cycle, and setting a decrease of the mass flow rate of steam extracted from said high pressure steam system in the second operation cycle from the mass flow rate of the extracted steam in the first operation cycle to be larger than a decrease of the mass flow rate of steam extracted from said low pressure steam system in the second operation cycle from the mass flow rate of the extracted steam in the first operation cycle, such that temperature of the feedwater discharged from said feedwater heater lowers in the range of 1° C. to 40° C. in the second operation cycle from the feedwater temperature in the first operation cycle.

5. An operation method of a nuclear power plant comprising:
   a nuclear reactor;
   a steam system including a high pressure steam system and a low pressure steam system, which are supplied with steam generated in said nuclear reactor;
   a condenser for condensing the steam discharged from said low pressure turbine; and
   a feedwater system including a low pressure feedwater heater installed downstream of said condenser and upstream of a main feedwater pump and heating the feedwater supplied from said condenser, and a high pressure feedwater heater installed downstream of said main feedwater pump and upstream of the nuclear reactor and introducing the feedwater discharged from said high pressure feedwater heater to said nuclear reactor, the operation method comprising the steps of:
   uprating second nuclear thermal power in a second operation cycle of said nuclear reactor from first nuclear thermal power in a first operation cycle before the second operation cycle; and
   reducing a temperature rise obtained by said high pressure feedwater heater in the second operation cycle in comparison with a temperature rise obtained by said high pressure feedwater heater in the first operation cycle, such that temperature of the feedwater discharged from said high pressure feedwater heater lowers in the range of 1° C. to 40° C. in the second operation cycle from the feedwater temperature in the first operation cycle.

6. An operation method of a nuclear power plant comprising:
   a nuclear reactor;
   a steam system including a high pressure steam system and a low pressure steam system, which are supplied with steam generated in said nuclear reactor;
   a condenser for condensing the steam discharged from said low pressure turbine; and
   a feedwater system including a low pressure feedwater heater installed downstream of said condenser and upstream of a main feedwater pump and heating the feedwater supplied from said condenser, and a high pressure feedwater heater installed downstream of said main feedwater pump and upstream of the nuclear reactor and introducing the feedwater discharged from said high pressure feedwater heater to said nuclear reactor, the operation method comprising the steps of:
   uprating second nuclear thermal power in a second operation cycle of said nuclear reactor from first nuclear thermal power in a first operation cycle before the second operation cycle; and
   reducing a proportion of a temperature rise obtained by said high pressure feedwater heater in the second operation cycle with respect to a total temperature rise obtained by said high pressure feedwater heater and said low pressure feedwater heater in comparison with a proportion of a temperature rise obtained by said high pressure feedwater heater in the first operation cycle with respect to the total temperature rise obtained by said high pressure feedwater heater and said low pressure feedwater heater, such that temperature of the feedwater discharged from said high pressure feedwater heater lowers in the range of 1° C. to 40° C. in the second operation cycle from the feedwater temperature in the first operation cycle.

7. An operation method of a nuclear power plant comprising:
a nuclear reactor;
a steam system including a high pressure steam system and a low pressure steam system, which are supplied with steam generated in said nuclear reactor, said steam system further including at least one of a moisture separator, a moisture separator and heater, and a moisture separator and reheater between said high pressure steam system and said low pressure steam system;
a condenser for condensing the steam discharged from said low pressure turbine; and
a feedwater system including a pressure feedwater heater for heating the feedwater supplied from said condenser and introducing the feedwater discharged from said feedwater heater to said nuclear reactor; and
at least one high pressure extraction line for extracting steam from an intermediate point of said high pressure turbine and a point downstream of an outlet of said high pressure turbine and upstream of an inlet of one of said moisture separator, said moisture separator and heater, and said moisture separator and reheater, and for introducing the extracted steam to said feedwater heater, the operation method comprising the steps of:
uprating second nuclear thermal power in a second operation cycle of said nuclear reactor from first nuclear thermal power in a first operation cycle before the second operation cycle; and
in said at least one high pressure extraction line through which the extracted steam flows in the first operation cycle, stopping the flow of the extracted steam in the second operation cycle or adjusting a flow rate of the extracted steam in the second operation cycle by extracted flow adjusting means disposed in said at least one high pressure extraction line, such that temperature of the feedwater discharged from said feedwater heater lowers in the range of 1° C. to 40° C. in the second operation cycle from the feedwater temperature in the first operation cycle.

8. An operation method of a nuclear power plant comprising:
a steam system including a high pressure turbine supplied with steam generated by heat of a nuclear reactor and a lower pressure turbine for introducing the steam discharged from said high pressure turbine;
a condenser for condensing the steam discharged from said low pressure turbine;
a feedwater system including a feedwater heater for heating feedwater supplied from said condenser and introducing the feedwater discharged from said feedwater heater to said nuclear reactor; and
a feedwater heater bypassing line for extracting a part of the feedwater from an intermediate point of the feedwater system and returning the extracted feedwater to said feedwater system after bypassing at least one unit of said feedwater heater, the operation method comprising the steps of:

uprating second nuclear thermal power in a second operation cycle of said nuclear reactor from first nuclear thermal power in a first operation cycle before the second operation cycle; and
lowering temperature of the feedwater discharged from said feedwater heater in the range of 1° C. to 40° C. in the second operation cycle from the feedwater temperature in the first operation cycle.

9. The operation method of the nuclear power plant according to claim 1, wherein the following formulae are satisfied;

$$0 < A \leq 5, \text{ and}$$

$$T2 \leq T1 - 7.7 \times (Q2-Q1)/(4.5 \times W)$$

where temperature of the feedwater discharged from said feedwater heater in the first operation cycle is T1 (° C.), temperature of the feedwater discharged from said feedwater heater in the second operation cycle is T2 (° C.), core thermal power of said nuclear reactor in the first operation cycle is Q1 (KW), core thermal power of said nuclear reactor in the second operation cycle is Q2 (kW), a core flow rate of said nuclear reactor in the second operation cycle is W (kg/s), and a rate of the power uprate is A (%).

10. The operation method of the nuclear power plant according to claim 1, wherein the following formulae are satisfied;

$$5 < A \leq 10, \text{ and}$$

$$T2 \leq T1 - 7.7 \times (Q2 \times (A+95)/100 - Q1)/(4.5 \times W)$$

where temperature of the feedwater discharged from said feedwater heater in the first operation cycle is T1 (° C.), temperature of the feedwater discharged from said feedwater heater in the second operation cycle is T2 (° C.), core thermal power of said nuclear reactor in the first operation cycle is Q1 (kW), core thermal power of said nuclear reactor in the second operation cycle is Q2 (kW), a core flow rate of said nuclear reactor in the second operation cycle is W (kg/s), and a rate of the power uprate is A (%).

11. The operation method of the nuclear power plant according to claim 1, wherein the following formulae are satisfied;

$$10 < A < 30, \text{ and}$$

$$T2 \leq T1 - 7.7 \times (Q2 \times (A+90)/100 - Q1)/(4.5 \times W)$$

where temperature of the feedwater discharged from said feedwater heater in the first operation cycle is T1 (° C.), temperature of the feedwater discharged from said feedwater heater in the second operation cycle is T2 (° C.), core thermal power of said nuclear reactor in the first operation cycle is Q1 (kW), core thermal power of said nuclear reactor in the second operation cycle is Q2 (kW), a core flow rate of said nuclear reactor in the second operation cycle is W (kgls), and a rate of the power uprate is A (%).

12. The operation method of the nuclear power plant according to claim 1, wherein the first operation cycle is an operation cycle that is performed for the first time after installation of said nuclear power plant, the second operation cycle is an operation cycle after the first operation cycle, and at least one operation cycle is interposed between the first operation cycle and the second operation cycle.

* * * * *